(12) United States Patent
Shastri et al.

(10) Patent No.: US 10,735,196 B2
(45) Date of Patent: *Aug. 4, 2020

(54) PASSWORD-LESS AUTHENTICATION FOR ACCESS MANAGEMENT

(71) Applicant: Oracle International Corporation, Redwood Shores, CA (US)

(72) Inventors: Venugopal Padmanabhan Shastri, Cary, NC (US); Sreenivasa R. Chitturi, Fremont, CA (US); Vamsi Motukuru, Monmouth, NJ (US); Mandar Bhatkhande, Milpitas, CA (US); Sunil Kumar Joshi, Haldwani (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,406

(22) Filed: Nov. 7, 2018

(65) Prior Publication Data

US 2019/0074972 A1    Mar. 7, 2019

Related U.S. Application Data

(63) Continuation of application No. 15/299,950, filed on Oct. 21, 2016, now Pat. No. 10,158,489.

(Continued)

(51) Int. Cl.
*H04L 9/32* (2006.01)
*G06F 21/32* (2013.01)
(Continued)

(52) U.S. Cl.
CPC ............ *H04L 9/3231* (2013.01); *G06F 21/32* (2013.01); *G06F 21/36* (2013.01); *H04L 9/00* (2013.01);
(Continued)

(58) Field of Classification Search
CPC ......... H04L 9/3231; H04L 9/00; H04L 9/006; H04L 9/14; H04L 9/30; H04L 9/3228;
(Continued)

(56) References Cited

U.S. PATENT DOCUMENTS 5,636,280 A * 6/1997 Kelly ...................... G06F 21/31
380/281
6,246,769 B1    6/2001 Kohut
(Continued)

FOREIGN PATENT DOCUMENTS

CN         104660412        5/2015
EP         2743857          6/2014
(Continued)

OTHER PUBLICATIONS

Shirvanian et al. (Two-Factor Authentication Resilient to Server Compromise Using Mix-Bandwidth Devices, NDSS '14, Feb. 23-26, 2014, 16 pages) (Year: 2014).*

(Continued)

*Primary Examiner* — Oleg Korsak
(74) *Attorney, Agent, or Firm* — Kilpatrick Townsend & Stockton LLP

(57) ABSTRACT

An access management system is disclosed that can provide access to resources by password-less authentication. The access management system can provide multiple layers of security for authentication taking into account risk factors (e.g., device, location, etc.) to ensure authentication without compromising access. Contextual details of a user based on a mobile device can be used for authentication based on possession of a device. Password-less authentication of a user may be enabled by registration of devices and/or a location (e.g., a geo-graphic location) as trusted. Security data embedded with encrypted data can be sent to a first device for password-less authentication of a user at the (Continued)

device. A second device registered with the user can obtain the security data from the first device. The second device can decrypts the data and send the decrypted data to the access management system for verification to enable password-less authentication at the first device.

20 Claims, 24 Drawing Sheets

Related U.S. Application Data

(60) Provisional application No. 62/245,891, filed on Oct. 23, 2015.

(51) Int. Cl.
  *G06F 21/36* (2013.01)
  *H04L 29/06* (2006.01)
  *H04L 9/00* (2006.01)
  *H04L 9/14* (2006.01)
  *H04L 9/30* (2006.01)

(52) U.S. Cl.
  CPC ............... *H04L 9/006* (2013.01); *H04L 9/14* (2013.01); *H04L 9/30* (2013.01); *H04L 9/3228* (2013.01); *H04L 9/3234* (2013.01); *H04L 63/0853* (2013.01); *H04L 63/0861* (2013.01); *H04L 2463/082* (2013.01)

(58) Field of Classification Search
  CPC ............... H04L 9/3234; H04L 63/0853; H04L 63/0861; G06F 21/32; G06F 21/36
  See application file for complete search history.

(56) References Cited

U.S. PATENT DOCUMENTS

| | | |
|---|---|---|
| 6,412,077 B1 | 6/2002 | Roden et al. |
| 6,609,198 B1 | 8/2003 | Wood et al. |
| 6,892,307 B1 | 5/2005 | Wood et al. |
| 6,950,949 B1 | 9/2005 | Gilchrist |
| 7,020,084 B1 | 3/2006 | Tanaka et al. |
| 7,086,085 B1 | 8/2006 | Brown et al. |
| 7,523,309 B1 | 4/2009 | Talbot et al. |
| 7,562,222 B2 | 7/2009 | Gasparini et al. |
| 7,574,212 B2 | 8/2009 | McConnell et al. |
| 7,724,700 B1 | 5/2010 | Grayson et al. |
| 7,904,946 B1 | 3/2011 | Chu et al. |
| 8,010,996 B2 | 8/2011 | Cline et al. |
| 8,122,251 B2 | 2/2012 | Santos et al. |
| 8,141,140 B2 | 3/2012 | Wenzel et al. |
| 8,156,536 B2 | 4/2012 | Polk |
| 8,180,666 B2 | 5/2012 | Minert et al. |
| 8,204,808 B2 | 6/2012 | Amaitis et al. |
| 8,281,379 B2 | 10/2012 | Noe |
| 8,302,167 B2 | 10/2012 | Mennes et al. |
| 8,312,519 B1 | 11/2012 | Bailey et al. |
| 8,327,422 B1 | 12/2012 | Friedman et al. |
| 8,339,954 B2 | 12/2012 | Dahod |
| 8,453,224 B2 | 5/2013 | Mutt |
| 8,555,355 B2 | 10/2013 | Rathbun |
| 8,578,476 B2 | 11/2013 | Sama |
| 8,584,196 B2 | 11/2013 | Rafiq et al. |
| 8,625,796 B1 | 1/2014 | Ben Ayed |
| 8,627,438 B1 | 1/2014 | Bhimanaik |
| 8,671,444 B2 | 3/2014 | Kulkarni et al. |
| 8,677,464 B2 | 3/2014 | Smith et al. |
| 8,763,097 B2 | 6/2014 | Bhatnagar et al. |
| 8,843,997 B1 | 9/2014 | Hare |
| 8,856,892 B2 | 10/2014 | Faludi |
| 8,863,270 B2 | 10/2014 | Masiyowski et al. |
| 8,875,242 B2 | 10/2014 | Choi et al. |
| 8,898,765 B2 | 11/2014 | Goyal et al. |
| 9,083,691 B2 | 7/2015 | Banford |
| 9,130,903 B2 | 9/2015 | Ryman |
| 9,202,035 B1 | 12/2015 | Manusov et al. |
| 9,218,476 B1 | 12/2015 | Roth et al. |
| 9,554,389 B2 | 1/2017 | Anchan et al. |
| 9,560,076 B2 | 1/2017 | Schultz et al. |
| 9,569,472 B2 | 2/2017 | Hegde et al. |
| 9,635,022 B2 | 4/2017 | Potonniee |
| 9,769,147 B2 | 9/2017 | Mathew et al. |
| 9,787,657 B2 | 10/2017 | Kottahachchi et al. |
| 9,864,944 B2 | 1/2018 | Radu et al. |
| 9,866,640 B2 | 1/2018 | Motukuru et al. |
| 9,887,981 B2 | 2/2018 | Mathew et al. |
| 9,912,810 B2 | 3/2018 | Segre et al. |
| 10,158,489 B2 | 12/2018 | Shastri et al. |
| 10,164,971 B2 | 12/2018 | Mathew et al. |
| 10,225,283 B2 | 3/2019 | Mathew et al. |
| 10,250,594 B2 | 4/2019 | Chathoth et al. |
| 10,257,205 B2 | 4/2019 | Mathew et al. |
| 10,547,599 B1 | 1/2020 | Mehta et al. |
| 2003/0070091 A1 | 4/2003 | Loveland |
| 2004/0128561 A1 | 7/2004 | Bouchat et al. |
| 2004/0167984 A1 | 8/2004 | Herrmann |
| 2004/0215750 A1 | 10/2004 | Stilp |
| 2005/0015594 A1 | 1/2005 | Ashley et al. |
| 2005/0156947 A1 | 7/2005 | Sakai et al. |
| 2006/0056415 A1 | 3/2006 | Lee et al. |
| 2006/0145842 A1 | 7/2006 | Stilp |
| 2006/0274920 A1 | 12/2006 | Tochikubo et al. |
| 2007/0067828 A1 | 3/2007 | Bychkov |
| 2007/0125840 A1 | 6/2007 | Law et al. |
| 2007/0130463 A1 | 6/2007 | Law et al. |
| 2007/0136573 A1 | 6/2007 | Steinberg |
| 2007/0199053 A1 | 8/2007 | Sandhu et al. |
| 2007/0200597 A1 | 8/2007 | Oakland |
| 2007/0220597 A1 | 9/2007 | Ishida |
| 2008/0120507 A1 | 5/2008 | Shakkarwar |
| 2008/0148351 A1 | 6/2008 | Bhatia et al. |
| 2009/0037763 A1 | 2/2009 | Adhya et al. |
| 2009/0288148 A1 | 11/2009 | Headley et al. |
| 2009/0292927 A1 | 11/2009 | Wenzel et al. |
| 2010/0057599 A1 | 3/2010 | Hall et al. |
| 2010/0146263 A1 | 6/2010 | Das et al. |
| 2011/0320616 A1 | 12/2011 | Wray |
| 2011/0320820 A1 | 12/2011 | Wray |
| 2012/0066749 A1 | 3/2012 | Taugbol et al. |
| 2012/0180124 A1 | 7/2012 | Dallas et al. |
| 2012/0203906 A1 | 8/2012 | Jaudon et al. |
| 2012/0233684 A1 | 9/2012 | Denis et al. |
| 2012/0311321 A1 | 12/2012 | Landrock et al. |
| 2012/0314862 A1 | 12/2012 | Min |
| 2013/0111208 A1 | 5/2013 | Sabin et al. |
| 2013/0139233 A1 | 5/2013 | Maity |
| 2013/0159732 A1 | 6/2013 | Leoutsarakos |
| 2013/0167208 A1* | 6/2013 | Shi .................. H04L 63/18 726/5 |
| 2013/0185209 A1 | 7/2013 | Ahn |
| 2013/0198613 A1 | 8/2013 | Scoda |
| 2013/0205373 A1 | 8/2013 | Jaudon et al. |
| 2013/0219479 A1 | 8/2013 | DeSoto et al. |
| 2013/0290719 A1 | 10/2013 | Kaler et al. |
| 2014/0047233 A1 | 2/2014 | Kalin et al. |
| 2014/0082706 A1 | 3/2014 | Banford |
| 2014/0096190 A1 | 4/2014 | Subramanya et al. |
| 2014/0208386 A1 | 7/2014 | Sama |
| 2014/0214688 A1 | 7/2014 | Weiner et al. |
| 2014/0250490 A1 | 9/2014 | Baca et al. |
| 2014/0279445 A1 | 9/2014 | Jiang et al. |
| 2015/0121503 A1 | 4/2015 | Xiong |
| 2015/0150110 A1 | 5/2015 | Canning et al. |
| 2015/0222615 A1 | 8/2015 | Allain et al. |
| 2015/0249540 A1 | 9/2015 | Khalil et al. |
| 2015/0271164 A1* | 9/2015 | Hamid ............... H04L 63/0853 726/7 |
| 2015/0304847 A1 | 10/2015 | Gong et al. |
| 2015/0310441 A1 | 10/2015 | Li |
| 2015/0312252 A1 | 10/2015 | Potonniee |
| 2015/0317613 A1 | 11/2015 | Clark |
| 2016/0036808 A1 | 2/2016 | Li |

(56) References Cited

U.S. PATENT DOCUMENTS

| | | | |
|---|---|---|---|
| 2016/0050211 A1* | 2/2016 | Barshow | H04L 63/102 726/4 |
| 2016/0063226 A1 | 3/2016 | Singh et al. | |
| 2016/0065554 A1 | 3/2016 | Brown et al. | |
| 2016/0285871 A1 | 9/2016 | Chathoth et al. | |
| 2016/0379431 A1 | 12/2016 | Borg et al. | |
| 2017/0034152 A1 | 2/2017 | Subramanya et al. | |
| 2017/0091730 A1 | 3/2017 | Gurunathan et al. | |
| 2017/0118025 A1 | 4/2017 | Shastri et al. | |
| 2017/0118202 A1 | 4/2017 | Mathew et al. | |
| 2017/0118223 A1 | 4/2017 | Mathew et al. | |
| 2017/0126733 A1 | 5/2017 | Mathew et al. | |
| 2018/0027006 A1 | 1/2018 | Zimmermann et al. | |
| 2018/0048472 A1 | 2/2018 | Pirrwitz et al. | |

FOREIGN PATENT DOCUMENTS

| | | |
|---|---|---|
| WO | 2012156785 | 11/2012 |
| WO | 2014041336 | 3/2014 |
| WO | 2017069800 | 4/2017 |
| WO | 2017070412 | 4/2017 |

OTHER PUBLICATIONS

U.S. Appl. No. 16/191,955, "Final Office Action", dated Nov. 12, 2019, 25 pages.
HSBC Internet Banking Terms and Conditions, Available Online at: <URL: http://www.hsbc.co.in/1/2/ALL_SITE_PAGES/HUB_PIB/PIB_TERMS_AND_CONDITIONS#pib5>, 2015, 30 pages.
Configuring Authentication Mechanisms, Available Online at: https://help.sap.com/saphelpnw70ehp1/helpdata/en/8f/ae29411ab3dbe100OOOOO550bO/frameset.htm, 2015, 2 pages.
Designing a Good Security Policy for Your Websites, Available Online at: http://programmergamer.blogspot.in/2013_04_01_archive.html, Apr. 29, 2013, 4 pages.
DirX Access V8.3 Web Access Management and Identity Federation, Technical Data Sheet, Available Online at: http://atos.net/contentldam/global/documents/we-do/atos-dirx-access-v83-datasheet.pdf>, Dec. 2013, 14 pages.
EToken 3500-OTP Banking Token, Available Online at: http://www.safenet-inc.com/multi-factor-authentication/authenticators/one-timepassword-otp/etoken-3500-banking-token/#content-left>, 2006-2015, 2 pages.
How to Configure a Separate Maximum Failure Counter and Threshold for OTP Authentication, Available Online at: https://support.ca.com/cadocs/0/CA%205iteMinder%2012%2052%20SP1ENU/Bookshelf_Files/HTMUidocs/index.htmtoc.htm1945685.htmlintcmp=searchresultclick&resultnum=1805, 2 pages.
IBM Worklight Application Authenticity Overview, Available Online at: http://www-01.ibm.com/support/knowledgecenter/SSZH4A_6.1.com.ibm.worklight.dev.doc/dev/c_ibm_worklight_app_authentication_overview.html>, 3 pages.
JPMorgan ACCESSSM Security Features, JPMorgan Chase & Co., Jun. 2008, 2 pages.
Mapping Fed Authn Methods to Authn Levels in OIF/SP, Available Online at: http://prsync.com/oracle/mapping-fed-authn-methods-to-authn-levels-in-oif--sp-624805, Jul. 17, 2014, 5 pages.
McAfee One Time Password 3.5 Administration Guide, Available Online at: https://kc.mcafee.com/resources/sites/MCAFEE/content/live/PRODUCT_DOCUMENTATION/24000/PD24538/en_US/OTP 3_5_admin_guide.pdf, 2013, 120 pages.
New Security Token FAQs, Maybank2u.com, Available Online at: <URL: http://info.maybank2u.com.sg/eservices/personal/faq/faq-security-token.aspx>, 2015, 10 pages.
One Strong Authentication Solution for Every CA SSO Application, Available Online at: http://www.idfconnect.com/products/sso-mobilekey/, 1 page.
OpenID Connect Single Sign-On (SSO), Connect2id Ltd., Available Online at: http://connect2id.com/products/server/single-sign-on, 2015, 1 page.
OTP c600 Secure Transaction Signing + OTP Mobile Token, Available Online at: http://www.rockey.com.my/wordpress/onetime-password-authentication-token/otp-c600>, 2016, 2 pages.
Overload Protection, Available Online at: http: l/kb.paessler.com/en/topic/25523-what-is-overload-protection, Sep. 28, 2011, 9 pages.
Problems Viewing or Passing Captcha Verification, Available Online at: https://help.yahoo.com/kb/SLN2662.html, 1 page.
Show PHP Captcha on Failed Login Attempts, Available Online at: http://phppot.com/php/show-php-captcha-on-failed-login-attempts, 2008-2014, 6 pages.
Single Sign-On (SSO), Available Online at: https://support.ca.com/cadocs/0/CASiteMinder% 2012%2052% 20SP1-ENU/Bookshelf_Files/HTMUidocs/index.htmtoc.htm256655.htmlintcmp=searchresultclick&resultnum=817, Jun. 22, 2015, 5 pages.
SolidPass Frequently Asked Questions FAQ, solidpass.com, Available Online at: <URL: http://www.solidpass.com/frequently-asked-questions-faq.html>, 2014, 3 pages.
YESsafe Mobile Token, i-sprint.com, Available Online at: http://www.i-sprint.com/wp-content/uploads/yessafe_token.pdf>, 2015, 2 pages.
U.S. Appl. No. 14/671,935 Final Office Action dated Mar. 23, 2017, 24 pages.
U.S. Appl. No. 14/671,935 Final Office Action dated May 2, 2018, 6 pages.
U.S. Appl. No. 14/671,935 Non-Final Office Action dated Sep. 22, 2016, 22 pages.
U.S. Appl. No. 14/671,935 Non-Final Office Action dated Aug. 28, 2017, 26 pages.
U.S. Appl. No. 14/671,935 Notice of Allowance dated Oct. 22, 2018, 13 pages.
U.S. Appl. No. 14/920,807 Non-Final Office Action dated Feb. 1, 2018, 19 pages.
U.S. Appl. No. 14/920,807 Notice of Allowance dated Aug. 29, 2018, 7 pages.
U.S. Appl. No. 15/294,381 First Action Interview Office Action Summary dated Aug. 16, 2018, 5 pages.
U.S. Appl. No. 15/294,381 First Action Interview Pilot Program Pre-Interview Communication dated May 21, 2018, 6 pages.
U.S. Appl. No. 15/298,624 Non-Final Office Action dated May 31, 2018, 15 pages.
U.S. Appl. No. 15/298,624 Notice of Allowance dated Nov. 1, 2018, 9 pages.
U.S. Appl. No. 15/299,950 Notice of Allowance dated Aug. 30, 2018, 19 pages.
Dhamija et al., Phish and HIPs: Human Interactive Proofs to Detect Phishing Attacks, Human Interactive Proofs, Second International Workshop on Human Interactive Proofs (Hip 2005), Xp008130711, May 1, 2005, pp. 127-141.
Lee, 14.8, OpenSSH, Available Online at: https://www.freebsd.org/doc/handbook/openssh.html>, 1995-2015, 7 pages.
International Application No. PCT/US2016/025402, International Preliminary Report on Patentability dated Nov. 22, 2017, 8 pages.
International Application No. PCT/US2016/025402, International Search Report and Written Opinion dated Jul. 18, 2016, 14 pages.
International Application No. PCT/US2016/058016, International Preliminary Report on Patentability dated May 3, 2018, 10 pages.
International Application No. PCT/US2016/058016, International Search Report and Written Opinion dated Dec. 7, 2016, 13 pages.
Puhalla, OpenAM Session Upgrade, Available Online at: http:l/blog.profiqcz/2012/09/21/openam-session-upgrade-overview/, Sep. 21, 2012, 3 pages.
Ricci, Facing Authentication Threats: One Time Passwords and Transaction Signing, Security Community Blog, Available Online at: <URL: http://www.symantec.com/connect/blogs/facing-authentication-threats-onetime-passwords-and-transaction-signing>, Mar. 28, 2013, 4 pages.
Sani, Preventing Brute Force Login Attacks to the Citrix NetScaler Gateway/AMTM Login Pages, Available Online at: http: l/blogs.citrix.com/2012/02/01/preventing-brute-force-login-attacks-to-thecitrix-netscaler-access-gateway-or-aaa-for-tm-login-page-%E2%80%93-part-1/, Feb. 1, 2012, 6 pages.

(56) References Cited

OTHER PUBLICATIONS

Youll, Fraud Vulnerabilities in SiteKey Security at Bank of America, Available online at: URL: http://cr-labs.com/publications/SiteKey-28068718.pdf, Jul. 18, 2006, 16 pages.
U.S. Appl. No. 16/191,955, "Non-Final Office Action", dated Apr. 22, 2019, 19 pages.
U.S. Appl. No. 15/294,381, "Notice of Allowance", dated Dec. 18, 2018, 12 pages.
U.S. Appl. No. 15/298,624, "Corrected Notice of Allowability", dated Dec. 28, 2018, 6 pages.
U.S. Appl. No. 16/191,955, "Notice of Allowance", dated Feb. 14, 2020, 17 pages.
"Enhancing One-Time Passwords for Protection Against Real-Time Phishing Attacks", RSA Security Inc., 2004, pp. 1-10.
U.S. Appl. No. 16/254,390, "Notice of Allowance", dated Apr. 3, 2020, 17 pages.

\* cited by examiner

FIG. 12

Acme
International

My Trusted Devices
- Tony-Laptop  [Remove]   ◦ Tony-Desktop  [Remove]

My Trusted Locations
- Acme HQ  [Remove]   ◦ Home  [Remove]

My Challenge Question/Answers
- Which city were you born ?  ********  [Edit]
- Which year did you meet your spouse ?  ****  [Edit]
- Which street did you live in when you were a kid ?  ********  [Edit]

My Second Factor Preference
- One Time Pin through OMA  [Edit]

PASSWORD-LESS AUTHENTICATION FOR ACCESS MANAGEMENT

CROSS-REFERENCE TO RELATED APPLICATIONS

The present application is a continuation of, and claims the benefit and priority to U.S. application Ser. No. 15/299,950, filed Oct. 21, 2016, issued as U.S. Pat. No. 10,158,489, entitled "PASSWORD-LESS AUTHENTICATION FOR ACCESS MANAGEMENT," which claims the benefit and priority under 35 U.S.C. 119(e) of U.S. Provisional Application No. 62/245,891, filed Oct. 23, 2015, entitled "PASSWORD-LESS AUTHENTICATION FOR ACCESS MANAGEMENT," the contents of which are herein incorporated by reference in their entirety for all purposes.

BACKGROUND

Generally, the present application relates to data processing. More specifically, the application is related to techniques for multi-stage authentication.

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier, less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to the requestor. This token is like a key that can be used to open a door that guards restricted data. For example, a user may attempt to access a human resources database to gather information about certain employees such as salary information. The user's web browser makes a request to the application, which requires authentication. If the web browser does not have a token, the user is asked to log in to the access management system. When the user is authenticated, the user's browser receives a cookie that represents a token that may be used to access the human resources application.

In an enterprise, users (e.g., employees) typically may have access to one or more different systems and applications. Each of these systems and applications may utilize different access control policies and require different credentials (e.g., user names and passwords). Single sign-on (SSO) can provide a user with access to multiple systems and applications after an initial login. For example, when the user logs-in to their work computer, the user can then also have access to one or more other resources, such as systems and applications. An access management system may challenge a user to verify his/her identity to determine access to a resource. The user may be challenged for information based on a combination of "what you have," "what you know," and "who you are."

Access management systems can prompt a user with a graphical user interface on a client device to challenge the user for information to verify the user's credentials. Sometimes, information requested of a user may include sensitive, confidential information, which if comprised, may threaten the identity and personal information (e.g., financial information or account information) of the individual. As a result, users may be hesitant to provide sensitive information to a system, such as a server, to gain access to resources, without being sure that the system requesting the information does actually control access to those resources.

With on-going technology-based advances in identity theft using techniques such as spoofing and phishing, users are even more reluctant to provide their credentials without being sure that the recipient is an access management system. Access management systems are also unsure as to the authenticity of the source of credentials. In some instances, a client system may receive a one-time code (e.g., password) to enable the user operating the client system to access a resource via the access management system. The client system, if compromised or stolen, may enable a user operating the client system to obtain unauthorized access to a resource using the one-time code.

Though passwords have been an accepted norm for authenticating users and providing access, they are fraught with problems—people forget their passwords or make it easy enough to be guessed. Using layered security and multiple factors of authentication is gaining ground as a more secure method authentication to prevent fraud.

BRIEF SUMMARY

The present disclosure relates to an access management system. Certain techniques are related to enabling password-less authentication. These techniques provide multiple layers of security for authentication taking into account the various risk factors (device, location etc.) to ensure legitimate users have an easy way to authenticate and access the resources they need while making it difficult for fraudsters to game the system. With the rise in use of mobile devices, techniques disclosed herein enable use of a mobile device as a point of trust for multi-factor authentication. The access management system in the present disclosure can utilize contextual details of a user based on a device to ensure authentication of a user based on possession of the device.

The access management system can coordinate registration of devices (e.g., mobile devices) and/or a location (e.g., a geo-graphic location) associated with a user. Once registered, the devices and/or locations can be trusted by the access management system for access to users associated with those devices and/or locations. The access management system may enable password-less authentication of a user associated with any of a trusted device and/or location. Using devices registered with the access management system, a user can be provided with access to resource(s). A device registered with the access management system can be utilized for password-less authentication to authenticate the user at a trusted device and/or location. The possession of a registered device can serve as a point of trust to ensure that a user associated with the device is legitimate as a previously authenticated user.

In at least embodiment, device fingerprinting and geo-location techniques can be utilized to reliably identify a device or a location associated with a device as being a trusted from which the user is requesting access. To register a device or a location as trusted, the access management system may employ one or more authentication processes (e.g., multi-factor authentication). For example, multi-factor authentication may include using an out-of-band verification process with a device (e.g., a mobile phone) that has been pre-registered against the user's account. Once registered, the device can be used for password-less authentication to capture security data sent to a different device from which password-less authentication is to be performed. Further authentication (e.g., biometric authentication) at the pre-registered device may be used to reliably identify a user before allowing the user to perform password-less authentication. Contextual details of a user based on a mobile device can be used for authentication of the user based on possession of a device pre-registered with the access management system.

Access management system may perform password-less authentication by generating security data embedded with encrypted data. The security data can be sent to a first device from which password-less authentication is to be performed. A second device registered with the user can obtain the security data from the first device. The second device can decrypts the data using security information (e.g. a key) provided to it by the access management system. The second device can send the decrypted data to the access management system for verification. Upon successful verification, the access management system can send a message to the first device to enable access by password-less authentication.

Techniques disclosed herein enable use of multiple, different authentication processes for password-less authentication. Device fingerprinting and geo-location can reliably identify a device requesting access. Using out-of-band authentication (e.g., a one-time password) can allow a user to authorize sensitive access. Controlling access at a registered device through use of biometrics for local authentication can further ensure security of devices in possession of a user. Use of encryption for security data can secure communication between a device used for password-less authentication and a device at which password-less authentication is requested. The use of multiple authentication techniques including the use of a registered device as an authenticator, can improve security to ensure that access via an access management system is not compromised.

In some embodiments, an access management system may include a computer system that is configured to implement methods and operations disclosed herein. A computer system may include one or more processors and one or more memory accessible to the one or more processors and storing one or more instructions that, upon execution by the one or more processors, causes the one or more processors to implement methods and/or operations disclosed herein. Yet other embodiments relate to systems and machine-readable tangible storage media which employ or store instructions for methods and operations disclosed herein.

In at least one embodiment, a method includes receiving, from a first device, a request by a user for access to a resource. The method may include, based on the request, determining that the first device is registered for the user based on an authentication of the user at the first device prior to the request. The method may include generating security data for determining authentication of the user to access the resource using the first device. The security data may include first data that is based on information related to the user, and wherein the first data is encrypted based on an encryption key. The method may include sending the encryption key to a second device that the user has registered with the access management system, wherein the second device is different from the first device. The second device may be a mobile device, and the first device may be a computer system. The method may include sending the security data to the first device, wherein the first device presents the security data at an interface of the first device. The method may include receiving, from the second device, second data that is generated by the second device based on decryption of the first data included in the security data. The decryption of the first data may be performed by the second device using the encryption key sent to the second device. The security data may be obtained by the second device from a presentation of the security data at the first device. The method may include determining whether the second data includes the information that is included in the first data. The method may include, based on determining that the second data includes the information, enabling the first device to access the resource.

In some embodiments, the presentation of the security data at the first device is displaying the security data at the first device. The security data may include a quick response (QR) code that is displayed at the first device for the presentation of the security. The first data included in the security data may be embedded in the QR code.

In some embodiments, the method may include identifying the first device as being registered for the user based on one or more authentication processes for determining the authentication of the user at the first device, and wherein the encryption key is sent to the second device upon identifying the second device as being registered for the user. The second device, based on authenticating the user for access at the second device, may enable the user to operate the second device to obtain the security data from the presentation of the security data at the first device. The authenticating the user for access at the second device may include performing biometric authentication of the user based on previous biometric input provided for registration of the user.

In some embodiments, the request includes information identifying the first device. The first device may be identified by the first device being registered based on the authentication of the user associated with the information identifying the first device.

In some embodiments, the authentication of the user is determined based on one or more authentication processes including a first authentication process and a second authentication process. The second authentication process may be different from the first authentication process. The method may further include, prior to the request, performing the first authentication process. The first authentication process may include verifying credential information of the user received from the first device. The method may include, prior to the request, sending temporary access information to the second device and receiving the temporary access information from the first device. The method may include, prior to the request, performing a second authentication process. The second authentication process may include determining that the received temporary access information matches the temporary access information sent to the second device. In some embodiments, the temporary access information is a personal identification number associated with a time period for which the temporary access information is valid for the second authentication process.

In some embodiments, the method includes sending, to the first device, a message indicating that access to the resource is enabled. The first device may generate a graphical interface to enable access to the resource at the first device.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures:

FIGS. 3-18 illustrate interfaces for enabling multi-factor authentication for access by an access management system.

DETAILED DESCRIPTION

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Figure 1:
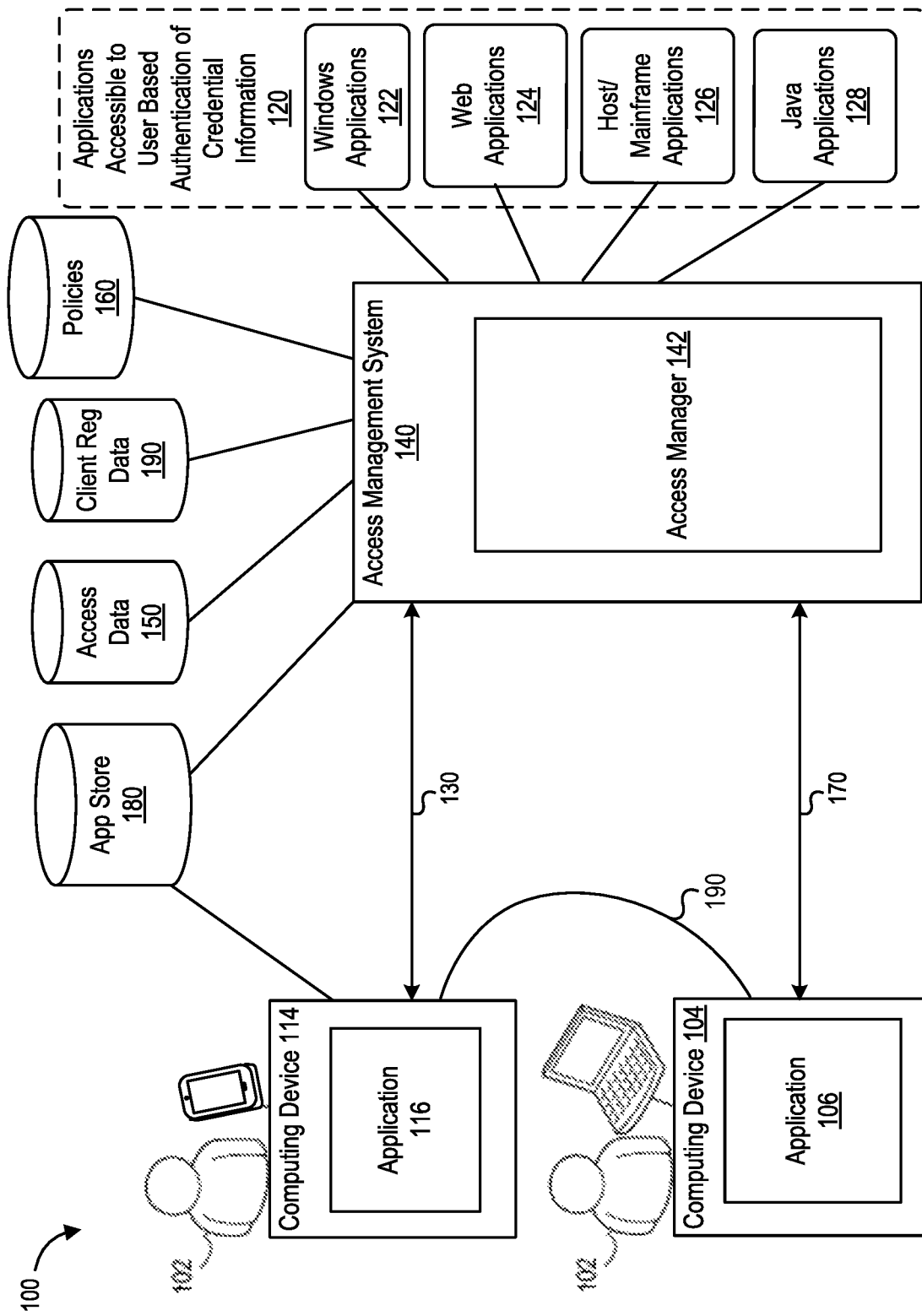
FIG. 1 illustrates a high-level diagram of a system for enabling multi-factor authentication for access by an access management system, in accordance with an embodiment.

I. High-Level Overview of an Access Management System for Password-Less Authentication Some embodiments, such as systems, methods, and machine-readable media, are disclosed for multi-factor authentication using multiple clients, e.g., a computing device 104 and computing device 114. FIG. 1 illustrates a system 100 in which a user (e.g., user 102) can register a device as a "trusted device" to enable password-less authentication with access management system 140. Password-less authentication may enable devices to be registered as "trusted" devices for authentication of a user via access management system to obtain access to resources. Trusted devices may be registered for password-less authentication of a user associated with those devices. A geographical location that is identified with a device may be registered as a "trusted location," which upon detection, can be a location where password-less authentication can be implemented after registration.

System 100 can provide single sign-on (SSO) access. A SSO session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

A client may include a computing device or an application executing on a computing device. In FIG. 1, computing device 104 (e.g., a desktop computer system) may include application 106 executing on computing device 104. Application 106 may be downloaded from a source, such as an online application store, e.g., app store 180. Application 106 may be a web browser that provides access to an access management portal (e.g., "OOW Access Portal") that communicates with access management system 140 to control access to resources. Computing device 114 (e.g., a mobile device) may include application 116 executing on computing device 114. Application 116 may be downloaded from app store 180. Application 116 may be an authentication application that manages authentication for access management system 140. An example of an application may be a mobile authenticator application provided by Oracle, Corporation. As will be described below, applications 106, 116 may be used to registered a client with access management system 140. Application 106 may provide access to resources, while application 116 enables registration and password-less authentication of user 102 at computing device 104.

For purposes of illustration, "session" as described herein includes an SSO session; however, a session may include other types of sessions enabling access to a user. Access management system 140 may provide access one or more resources. Access management system 140 may implement a sign-on system, e.g., a SSO system, which can establish an SSO session to provide SSO access to one or more resources.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 102 in a SSO system.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include access manager 142, which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Each of computing devices 104, 114 may communicate with access management system 140 via one or more communication networks. Access management system 140 may communicate with computing device 104 via one or more communication networks 170. Access management system 140 may communicate with computing device 114 via one or more communication networks 130. Examples of communication networks may include a mobile network, a wireless network, a cellular network, a local area network (LAN), a wide area network (WAN), other wireless communication networks, or combinations thereof.

FIG. 1 shows an example in which user 102 can engage in communication with access management system 140 to prevent his access from being denied based on his actions at a client (e.g., computing device 104). In this example, user 102 operating computing device 114 may attempt to access a resource such as an application 106, e.g., any one of applications 120 or the resources accessible through applications 120. Applications 120 may be accessible to user 102 upon successful authentication of credential information for user 102. User 102 may attempt to provide credential information, which after several unsuccessful attempts, the user 102 may be denied access. Access may be denied based on an access threshold number of attempts being satisfied. Access management system 140 can communicate with a destination, e.g., computing device 114, to provide the user with temporary access information, which the user can provide to the access management system at computing device 104 to prevent his access from being denied.

In attempting to access an application, user 102 may operate an application (e.g., application 106) that manages access to a user's account via access management system 140. For example, application 106 is an access management application that may present interfaces, such as graphical user interfaces (GUIs), some of which are disclosed herein. The application may be provided as part of a service (e.g., a cloud service) or a network-based application. Applications may enable a user to access and perform services provided by access management system 140. Access management system 140 may be configured to run one or more services or software applications described in the foregoing disclosure. For example, access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices. As explained above, access management system 140 may perform authentication of a user (e.g., user 102) operating a client device (e.g., computing device 114). Authentication is a process by which a user verified to determine that he/she is who he/she claims to be.

Access management system 140 may also provide services or software applications can include non-virtual and virtual environments. In some embodiments, these services may be offered as web-based or cloud services or under Software as a Service (SaaS) model to the users of clients. The services offered by access management system 140 may include application services. Application services may be provided by access management system 140 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in access management system 140, which may be implemented as a cloud infrastructure system. Users can acquire the application services without the need for customers to purchase separate licenses and support. Various different SaaS services may be provided. Users operating clients may in turn utilize one or more applications to interact with access management system 140 to utilize the services provided by subsystems and/or modules of access management system 140.

In some embodiments, access management system 140 may use one or more policies stored in a data store 160 ("policies") to control access to resources. Policies 160 may include an authentication policy that specifies the authentication methodology to be used for authenticating the user for whom the access must be provided on a given resource. Policies 160 define the way in which the resource access is to be protected (e.g., type of encryption, or the like). Policies 160 may include an authorization policy that specifies the conditions under which a user or group of users has access to a resource. For example, an administrator may only authorize certain users within a group to access particular resources. Access management system 140 may determine authentication for an SSO session based on one or more of policies 160.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as access data 150, policies 160, app store 180, and client registration data 190 ("client reg data"). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Access manager 142 may handle processing to determine whether a valid session exists for user 102 to access a resource. Access manager 142 checks for a valid session for user 102 to access a requested resource that is protected. Access manager 142 may assess validity of a session for user 102 based on consideration of one or more access policies applicable to user 102. Based on determining that a valid session does not exist for user 102, access manager 142 may request credential information ("credentials") from user 102. Successful authentication of the credential information may provide the user with access to one or more resources, which may include a requested resource. Access manager 142 may implement multi-factor authentication to determine authentication of a user. Multi-factor authentication may involve use of multiple, different authentication techniques.

In some embodiments, access manager 142 can register a client associated with a user, such as computing device 104. A client may be registered as described in FIG. 2A using a different client, e.g., computing device 114. Information about a registered client, including geolocation information may be stored in client reg data 190. Authentication credentials for a user may be stored in access data 150. During registration, access manager 142 may generate or determine security information (e.g., one or more encryption keys) which is shared with clients, e.g., computing device 104 and computing device 114) to support registration and multi-factor authentication of devices by access management system 140. The encryption key may be stored in access data 150. Encryption performed as disclosed herein may use one or more known techniques for encryption. Security data may be generated by access manager 142 or may be pre-generated by another system. Security data may be encrypted using an encryption key designated for a registered user.

User 102 may operate computing device 104 to use application 106 to access a portal (e.g., a web page) provided by access management system 140 to register devices, such as computing devices 104, 114, as trusted authentication devices. Computing device 104 may request, though the portal, access management system 140 to access features for registration of a device. A request may be communicated to computing device 104, which in response, prompts user 102 for user credentials to determine authentication of a session. The request may include information (e.g., a URL) to a web page or a user interface (e.g., a web page, portal, or dashboard) to receive credential information. Access manager 142 may perform operations to authenticate credential information for user 102. In some embodiments, access manager 142 may store information about sessions established upon successful authentication of a user. For a SSO session (e.g., SSO authenticated sessions), the SSO session may be managed as a SSO session enabling access to all resources accessible to user based upon successful authentication of credential information for a user. Access manager 142 can determine resources that are protected and based on authentication sessions, can determine resources that are permitted and/or restricted for a session.

Upon registration of a device (e.g., computing device 114) to be trusted for use as a mobile authenticator for password-less authentication, the device may be used to perform password-less authentication for subsequent attempts to access resources at the portal. For example, computing device 114 may be used for password-less authentication of user by capturing security data presented at computing device 104. After computing device 104 is registered as a trusted device/location, access manager 142 may determine authentication of user 102 using password-less authentication upon a request from computing device 104 to access a resource. Access manager 142 may generate and send to computing device 104 security data including information that is encrypted. Computing device 104 may present the security data to user 102. Computing device 114 may obtain 190 the security data presented by computing device 104. Computing device 114 may communicate with computing device 104 to obtain the security data. FIG. 2B illustrates examples of password-less authentication upon registration of a device. Access manager 142 can manage information about trusted devices, such that the access manager 142 can communicate security information (e.g., a security key) to registered devices to enable those devices to operate as an authenticator for password-less authentication. Techniques for password-less authentication are further disclosed herein.

Communications between computing devices 104, 114 and access management system 140 can be received through a gateway system. The gateway system may support access management services. The gateway system may support access management services. For example, a single sign-on (SSO) gateway may implement one or more access agents, such as agent (e.g., web gate agent), to balance and/or handle requests from clients and access management system 140. In some embodiments, access management system 140 may be implemented in system 100 according to an agent-server model for communication between computing devices 114, 104 and any one of access manager servers implemented for access management system 140. The agent-server model may include an agent component (e.g., a gateway system) and a server compontent. The agent component may be deployed on a host system and the server component may be deployed on a server, e.g., an access manager server. Computing device 114 may be a workstation, personal computer (PC), laptop computer, smart phone, wearable computer, or other networked electronic device.

Access management system 140 may present user 102 with a request for authentication credentials in the form of a challenge (e.g., via the user's web browser at computing device 114). In some embodiments, user 102 can access an SSO user interface through a client executing on computing device 114 or through a web browser on computing device 114. The SSO user interface may be implemented at access management system 140. Access management system 140 may send the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application, e.g., application 140, through the SSO user interface, a request may be sent from computing device 114 to access management system 140 to determine a policy type for the application from one or more policies 160 applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent can enable users to access applications 120 using SSO services provided by access management system. Access may be provided through a web browser directly, without first accessing the SSO user interface or using a client executing on computing device 114. If user 102 is not authorized, then access management system may request credentials from user 102. The SSO user interface may present an interface to receive input including credential information. The credential information may be sent to access management system 140 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

II. Process for Registration of a Device as an Authenticator for Password-Less Authentication The some embodiments, such as those disclosed with respect to FIGS. 2A, 2B, and 3-18, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 2A, 2B, and 3-18, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., access management system 140 of FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in FIGS. 2A, 2B, and 3-18 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 2A:
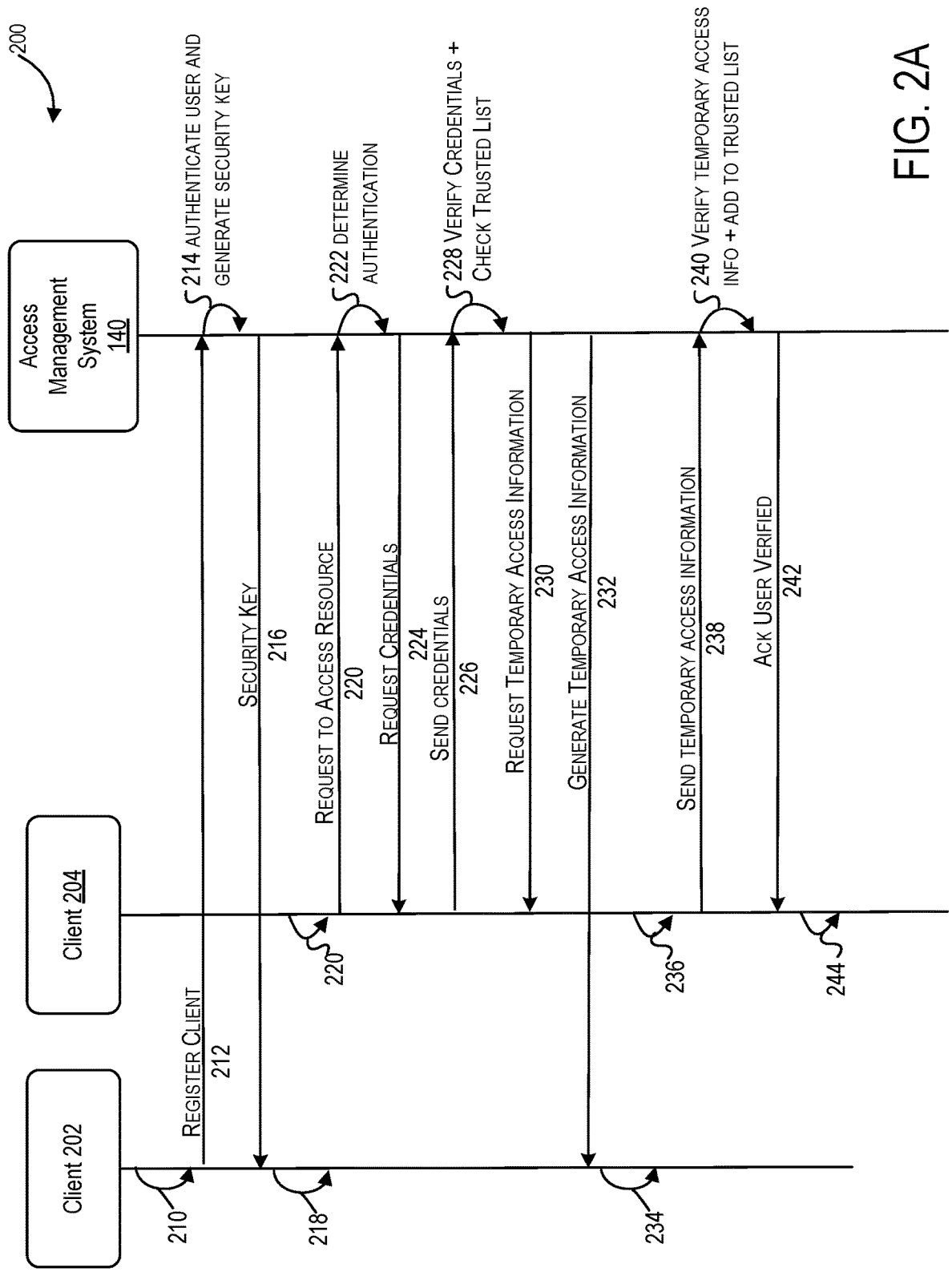
FIGS. 2A and 2B illustrate sequence diagrams showing operations for enabling multi-factor authentication for access by an access management system, in accordance with an embodiment.
Figure 2B:
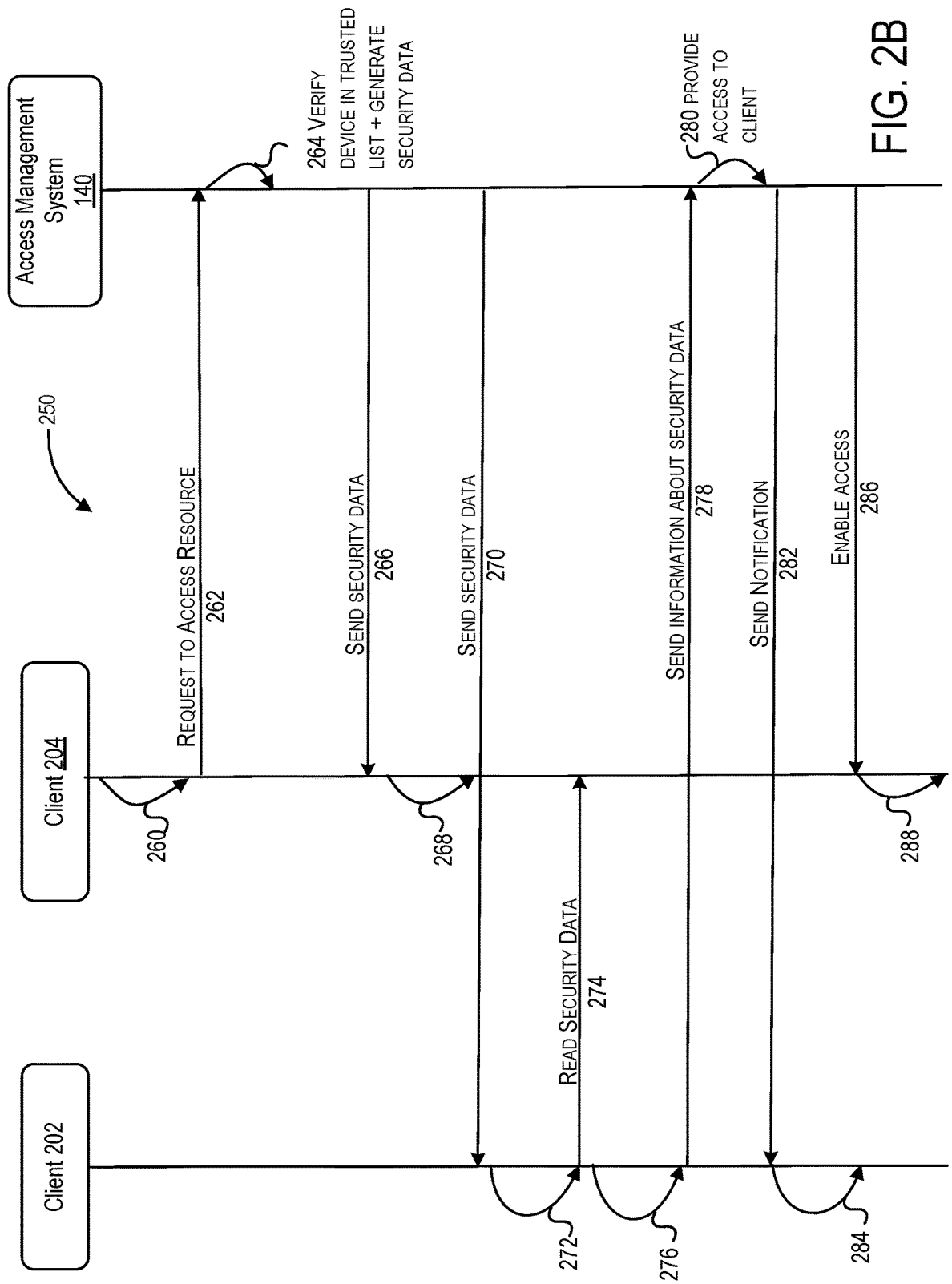

Now turning to FIG. 2A, examples are shown of operations 200 for multi-factor authentication which may be used to enable password-less authentication, in accordance with an embodiment. The operations described with reference to access management system 140 may be implemented by access manager 142, or multiple modules or blocks in access management system 140.

Starting at step 210, at user may operate a client 202 (e.g., computing device 114) to access or download an application (e.g., mobile authenticator application) from a source (e.g., app store 180). The source may be part of access management system 140. The application may be used for registration of client 202 with access management system 140 for password-less authentication. The application may be used for password-less authentication of a user after registration of client 202.

The user may need to register clients 202, and 204 with access management system 140 as part of an authentication process. Using the application, the application may request the user to provide credential information to authenticate the user. The credential information may be sent to access management system 140, at step 212. At step 214, access management system 140 may authenticate the user, and once authenticated, may store access data indicating authentication of the user. At step 216, access management system 140 may send security or access information (e.g., an encryption key) to client 202. The information may include a key pair, including a private and a public key, enabling client 202 to encrypt communications from access management system 140. Subsequent communication between access management system 140 and client 202 will be encrypted with these keys to ensure security.

At step 218, user can operate the application to configure the application for password-less authentication. Client 202 can be operated to register security information for multi-factor authentication. The security information may be used to configure additional security for use of the application for password-less authentication. Security information such as an access code (e.g., a 4 to 6 digit PIN) and biometric data (e.g., fingerprint) for biometric identification, may be registered for accessing the application. For every subsequent use of the application, the user may have to provide the security information to ensure additional security for using a trusted device for password-less authentication.

Figure 3:
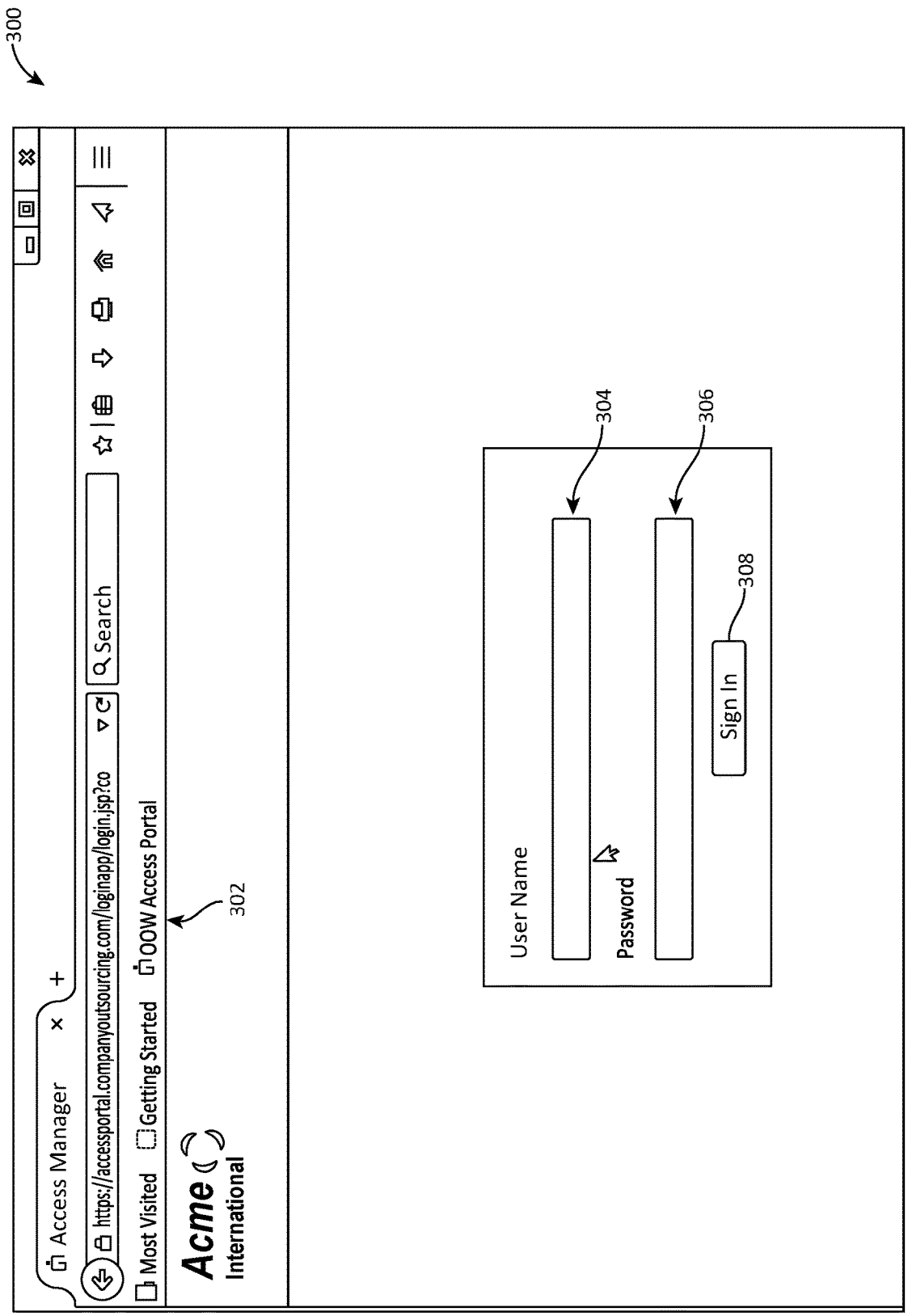
Figure 10:
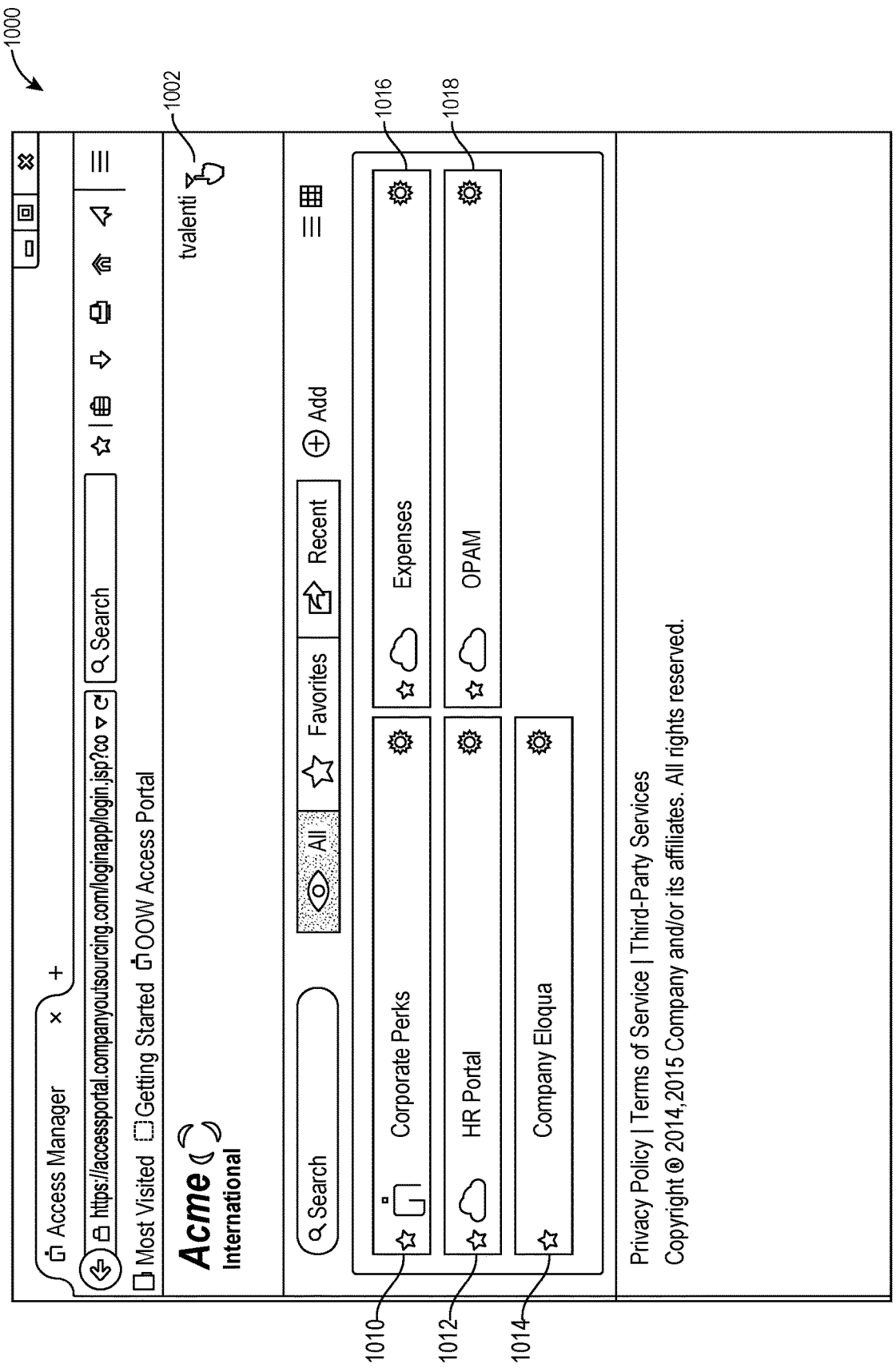

At step 220, the user may operate a different client, client 204 (e.g., a desktop computer, such as computing device 104) to access a resource protected by access management system 140. The access may be based on authentication of the user to access the resource. The resource may be accessed through an interface, such as a graphical user interface, presented in an application (e.g., a browser). To determine access, an application of access management system 140 may facilitate an authentication process. The authentication may include registration of other devices, as trusted devices, for password-less authentication. The application may provide interactive controls to facilitate registration of devices. The registration process may include authentication of the user using single or multi-factor authentication. At step 220, a user may interact with an application provided by access management system 140 to manage access to resources. The application may be presented with an interface (e.g., a portal) for access before resources can be accessed. An example of the interface is shown in FIG. 3. The resources may be through provided via an interface such as shown in FIG. 10. The interface may enable a user to request registration of a device to use for future authentication.

Client 204 may be a device that facilitates registration of other trusted devices, such as client 202. Client 204 may provide an interface to enable clients 202, 204 to be registered for password-less authentication. At step 220, client 204 may send a request to access management system 140 to be registered as a trusted device. In some embodiments, the request may include information about client 204, such as device information or information about an application through which the resource is requested. Such information may be determined based on factors like browser version, plugins etc. The request may include the geo-location of the user from the IP address of the browser. The information may be determined by client 204 and/or the application. The request may indicate information about a user requesting to register a device.

In at least on embodiment, upon a user requesting access to register a device, at step 222, access management system 140 may determine authentication of the user to register client 202. Access management system 140 can determine whether the user has authentication by the access management system 140, and if so, whether the access permitted includes registration of a device for password-less authentication. In some embodiments, access management system 140 may further determine the device for which authentication is requested is one which has been registered. Access management system 140 may further use the information from the request at step 220 to determine whether any devices correspond to a device which is requested to be registered. In some embodiments, access management system 140 can determine whether location information in the request matches information about the user, such as a location associated with the user's access. The information about the user may be obtained from an authoritative sources, such as a human resources system, accessible to the access management system. Access management system 140 may determine the device/geo-location for the device to be registered and validate if it is one of the user's trusted device/geo-location from its repository. A device is trusted if the user has authenticated using that device previously. In this example, client 204 is not trusted so access management system 140 may determine that the device is not authenticated.

At step 224, upon determining that the user is not authenticated at client 204, access management system 140 may send a request for credential information ("credentials") to authenticate the user to register a device. Client 204 may prompt a user at the application to request credential information based on the request from access management system 140. In some embodiments, the credential information may be provided automatically to access management system 140 as part of a SSO process implemented by access management system 140. At step 226, the user may provide credential information to the application, which sends the credential information to access management system 140 for authentication of the user.

At step 228, access management system 140 may validate the credential information to determine whether it matches credential information previously stored when access for the user was created. In some embodiments, access management system 140 can determine whether client 204, from which the request for registration originated, is a trusted device from which the user can register other devices. Access management system 140 may determine whether client 204 is found in the user's trusted list based on geolocation or some other information. Upon determining that the device is found in the list, access management system 140 may not challenge a user for credentials, and may proceed to step 242. Upon determining that client 204 is not found in a trusted list, access management system 140 will challenge the user for access information (e.g., a one-time pin or password) after the user. The access information may be temporary such that it remains valid based on one or more criteria, such as use, time, or a combination thereof.

At step 230, access management system 140 may request client 204 to provide temporary access information. The request for temporary information may be sent before or after the temporary access information is generated. At step 232, temporary access information may be generated by access management system 140. In some embodiments, access management system 140 may send a request to the application at client 204 to request the application to generate the temporary access information. In some embodiments, the temporary access information is limited in use based on one or more criteria. Access management system 140 may request another device, e.g., client 202, registered with access management system 140 to generate temporary access information. Access management system 140 may generate temporary access information and then send it to client 202 in an encrypted form that enables client 202 to decrypt the information using security information previously provided upon registration of the application on client 202.

In some embodiments, at step 230, access management system 140 may request the application to initiate a process for authentication using temporary access information. An application at client 204 may prompt a user with an interface to choose an option for receiving temporary access information. Step 232 may be performed based on the option selected. The application may communicate with access management system 140 to provide the option for temporary access information. At step 232, temporary access information may be provided using a variety of techniques to ensure secure access for registration of a device as a trusted device. Techniques include sending the temporary access information to a device (e.g., client 202) of the user, an email account of the user, a device associated with a phone number (e.g., an short messaging system message), or to a device through an application, such as one downloaded at client 202. The information about the user may be obtained from an authoritative source, such as a human resources system. At step 234, client 202 may be operated to access the temporary access information. If the user is a legitimate user, he will be able to use his fingerprint to authenticate himself in on the application at client 202. The application on client 202 may provide temporary access information. The temporary access information may be generated at client 202 or received from access management system 140. The temporary access information may be accessed by email using client 202 or an application that provides access to email where the temporary access information was sent.

At step 236, client 204 may be used to retrieve temporary access information, which may be accessible from client 204. The application at client 204 may provide an interface to receive temporary access information. The user may operate client 204 to provide the temporary access information requested by access management system 140. The information may be provided with other information identifying client 204 as a trusted device/location from which access to access management system 140 is permitted.

At step 238, the application on client 204 may send the temporary access information to access management system 140. At 240, access management system 140 may verify the temporary access information to determine that the temporary access information is correct as generated and is valid for the criteria defined for the temporary access information. Upon determining that the temporary access information does not match that was generated, access to register client 204 may be denied at the application. Upon determining that the temporary access information is correct, access management system 140 can store information about client 204 by adding the information to the trusted list. The geo-location may be saved with the information.

In some embodiments, access management system 140 may sent security information to devices associates with the user authenticated for client 204 registered as a newly trusted device. The security information may be sent to client 202. Devices associated with the user may be identified based on information about the user obtained from an authoritative source. The security information may have been sent before client 204 is determined to be a trusted device.

At step 242, access management system 140 may send a message to client 204 indicating that the user is authenticated to access the resource upon determining that the temporary access information is verified. The application at client 204 may change an interface enabling user to access resources and register a device for password-less authentication. Access management system 140 may send information that the user is authenticated such as access to resources and other information about devices and locations that are registered for the user.

FIG. 2B illustrates an example of operations 250 for password-less authentication according to some embodiments. In FIG. 2B, a client 204 may provide a user with access to an application upon successful authentication of the user. The user may be authenticated to access the application by the operations disclosed with reference to FIG. 2A. At step 260 of FIG. 2B, client 204 may provide an interface to enable a user to logout or end a session for access of the application. A user may interact with the interface to terminate an access session through the application. At step 262, a user may request access again to features and resources through the application. A user may interact with the application to request access. Client 204 may send a request for access at 304. The request may include information about client 204 (e.g., device information) and/or geo-location information. The information may be obtained using techniques disclosed herein, such as those described with reference to FIG. 2A.

At step 264, access management system 140 may determine whether the user is authenticated for the access using the application. Access management system 140 may determine that client 204 is a trusted device based on information included in the request. The information in the request may be compared to information stored by access management system for trusted devices that are registered for the user. Because client 204 is registered on the trusted list based on a previous registration process by performing operations 200, access management system may determine that client 204 is a trusted device.

At step 264, access management system 140 may deny access to client 204 upon determining that a device is not trusted. Access management system 140 may initiate an authentication process such as described with reference to FIG. 2A. Upon determining that client 204 is a trusted device that is registered, access management system 140 may generate security data. The security data may be audio data, video data, image data, other types of data, other perceptible data that can be recognized or captured by device, or combinations thereof. In at least one embodiment, the security data is generated as image data (e.g., a quick response (QR) code). The security data may be generated with information to implement a password-less authentication process. For example, the security data may be generated with security information (e.g., an encryption key) that is unique to the user provided with access. The information may be generated based on information unique or related to the user (e.g., birthdate, phone number, personal information, etc). The information may be a token. The information may be encrypted using security information (e.g., an encryption key). The information may be encrypted using one or more techniques for encryption known in the art. The security data may contain a unique request id that will be encrypted with an encryption key that was previously send to client 202 operated by user. The security data may be decrypted by an application on a device having access such as client 202 that is associated with the user. The security data serves as a convenient way of transferring a personal information about the from one device (e.g., client 204) to another device (e.g., client 202).

In some embodiments, because client 204 is a trusted device (e.g., a device identified as being authenticated for a user based on multi-factor authentication), at step 266, access management system may send the security information to client 204 for the application at client 204 to generate the security data. The security information may be sent to other devices that are registered with access management system through an application (e.g., mobile authenticator application). The security information may be sent to client 202 upon determining that client 204 is a trusted device. The mobile devices, such as client 202, may be used to perform password-less authentication by having the security information to decrypt information in the security data. Client 202 may be associated with the user based on information obtained from an authoritative source. To prevent unauthorized access at client 204, the security data may be sent with security information so as to prevent client 202 from obtaining the security information. The security information in security data may be encrypted using an encryption key for the user. The encryption key may be sent to devices, such as client 202 that are registered with access management system 140 for mobile authentication by password-less authentication. The encryption key may be used to read and/or decrypt the security information in the security data.

At step 268, client 204 may present the security data at client 204. The security data may be presented in an application that provides an interface to access management system 140. For example, an application provided by access management system 140 may display the security data at client 204. The security data may be presented based on one or more criteria. The criteria may be configurable to limit the security data to be displayed for a temporary period of time, such as 60-90 seconds within which a legitimate (e.g., an authorized user) can be expected to complete password-less authentication. This reduces the time available for a fraudster to access the security data code meant for an authorized user. The presentation of the security may prompt the user to operate another device (e.g., client 202) registered with access management as a trusted device for password-less authentication.

At step 270, access management system may send security data to client 202. Client 202 may be a device registered with access management system as a device of the user. The device may include an application for enabling password-less authentication. The security data may be different from security data sent at step 266. The security data may include security information to enable client 202 to read (e.g., decrypt) the security data presented at client 204.

At step 272, the user may operate client 202 to gain access to client 202. Access may be controlled using one or more authentication techniques. Multi-factor authentication may be used to improve security for use of client 202 for password-less authentication. Authentication techniques may include biometric authentication and other input driven authentication techniques. Client 202 may include an application provided by access management system 140 for authentication via access management system 140. The application may enable access to the application using one or more authentication techniques. The user authenticates him-self locally in the application and then enables a feature of the application to read the security data sent to client 204. The application may be configured to utilize one or more functions (e.g., camera, mic, or video recorder) on a device to capture security data presented at a client. In some embodiments, the security data sent at step 270 may be sent upon the user gaining access to the application at step 272. The application may communicate with access management system 140 for authentication of the user. Upon successful authentication, access management system 140 may sent the security data.

At step 274, upon gaining access at client 202, the user operates client 202, in particular the application. The client 202 may be operated to use one of its functions (e.g., a camera) to read or capture the security data displayed at step 268. For example, client 202 may be operated to use its camera to capture security data (e.g., a QR code) encrypted with security information provided by access management system 140 to client 204.

At step 276, client 202 is operated to process the security data obtained at step 274. In at least one embodiment, the application on client 202 may be operated to capture the security data presented by client 204 at step 268. If client 202 is registered for the user with access management system 140 it can read security information in the security data captured. The client 202 may have security data obtained from access management system 140. The application may use the security data to read security information from the security data captured at step 274. Since the application will be able to decrypt the security data with the security data that it obtained from access management system 140, the application may show the user the request details in the application and present one or more interactive elements to confirm receipt of the security data. When he confirms, the application may sends a secure communication back to access management system 140 at step 278.

At step 276, the application may perform operations to obtain data in the security data that is capture from client 204. The data may be obtained by decryption using security data provided by access management system. In some embodiments, the security data obtained from client 204 may be sent to access management system 140 for decryption.

At step 278, the application on client 202 may communicate with access management system 140. A secure communication may be sent with information about the security data captured from client 204. The information may include the security data obtained from client 204. For example, the application may send security information determined by decryption of the security data obtained from client 204. The communication may include authentication information of the user. The secure communication may not include authentication information upon determining that the application has authenticated the user for access management system 140.

At step 280, access management system 140 may verify access based on communication received from client 202. Access management system may verify that the information (e.g., a request identifier or a security key) received from client 202 as obtained from the security data captured from client 204 matches the information in the security data sent to client 204 at step 266. The information may be compared to determine whether they match. The information may be a decrypted form of the information included in the security data. The information in the decrypted form may be compared with information decrypted from the information encrypted in the security data. The information may be associated with criteria of the security data generated by access management system 140, such that the criteria are assessed to determine whether the security information is received from client 202 in satisfaction of the criteria (e.g. time).

At step 280, upon determining that the information received from client 202 at step 278 does not match the information in the security data that was generated, access management system 140 may deny access to client 204. The user may operate client 202 to request access management system 140 to send new security data to client 202. The access that is denied may include access to resources. The access management system 140 may communicate with client 204 to send new security data. The operations disclosed herein may be repeated to enable another attempt for password-less authentication. The number of attempts may be configurable as criteria to secure access at a desired level.

Upon determining that the information received from client 202 at step 278 matches the information in the security data that was generated, access management system 140 may permit access to client 204.

At step 282, access management system 140 may communicate with client 202 to send information as to whether access is permitted for user based on the communication sent at step 278. The information may be a notification as to whether access is permitted to user. At step 284, client 202 may provide the information.

At step 286, access management system 140 may communicate with client 204 to enable access to a resource. Access management system 140 may send information to notify an application on client 204 to enable access to resources. The information may include information about resources that are accessible or information for displaying options to enable access. At step 288, an application on client 204 may enable access to resources. For example, the application may provide an interface (e.g., portal) to access different resources. The resources may be provided by one or more resource management systems.

As described above, the operations disclosed with reference to FIGS. 2A and 2B enable password-less authentication upon registration of a device as a trusted with access management system 140. A user can authenticate at a trusted device by providing authentication at a mobile device (e.g., client 202) and use the mobile device to capture information from the trusted device. If a registered user is not able to capture the security data within the configurable period of time, access management system 140 may generate new security data upon request from client 202. However, access management system 140 also maintains a retry counter. If the user tries to make more than the maximum configured retry attempts to generate security data, access management system 140 may lock or prevent the user's access to deter fraud.

Optionally, access management system 140 can be configured to challenge user at a mobile device (e.g., client 202) using multi-factor authentication. This may allow three factors—something that the user has (his smart phone), something that the user has (e.g., a fingerprint) and something that the user knows (e.g., a person access code) to provide authentication. While the user may have to remember security information, the security information does not need to be as strong as the password since it is used in combination with other factors at the mobile device and using the mobile device to capture information from the trusted device.

Since the security data-based password less authentication may be implemented from a legitimate user's trusted device, a fraudster may not use it from any other device or location. If a fraudster manages to access the resource from the legitimate user's device and location he will may not be able to capture the security data with an application in client 202 because the application may not have security information to decrypt the security data meant for the legitimate user. If a fraudster manages to access the resource from the legitimate user's device and location and also steal the legitimate user's smart phone, he will still not be able to proceed because the application on client 204 may need the legitimate user's fingerprint to proceed with capturing the security data.

III. Interfaces for Password-Less Authentication

FIGS. 3-18 illustrate interfaces, e.g., graphical user interfaces (GUIs) for multi-factor authentication in an access management system, in accordance with an embodiment. the GUIs in FIGS. 3-18 may be displayed as part of an access portal, such as a web site or an application. Each of the GUIs in FIGS. 3-18 may be displayed in an application on a device. Each of the GUIs in FIG. 3-18 may be displayed by an access management application that manages access to one or more resources. Each of the GUIs may be accessed from access management system 140 or a may be part of an application installed on a client for communication with access management system 140.

Now turning to FIG. 3 is a GUI 300 for receiving credential information (e.g., a user name and a password). GUI 300 may be presented at a computing device 104 or client 204 operated by a user. GUI 300 may be presented in an application (e.g., browser)

GUI 300 may be presented the first time a user operates the client device to obtain access to resources by authentication via access management system 140. GUI 300 may be presented when a user requests access to a resource. GUI 300 may be presented as part of an application (e.g., "OOW Access Portal"), such as an access portal application or website, supporting access management system 140. GUI 300 may be presented as part of one or more authentication processes for registering the client device for a user. Any type of authentication process may be implemented in GUI 300.

GUI 300 may include one or more interactive elements to provide input (e.g., credential information) for an authentication process. Interactive element 302 in GUI 300 may receive input for user identification (e.g., "username"). Interactive element 304 in GUI 300 may receive input for credentials (e.g., "password"). Interactive element 306 in GUI may be interactive to submit a request for authentication with input received in the interactive elements.

Upon interaction with interactive element 306, credential information input into GUI 300 may be sent from the computing device 104 to access management system 140 for authentication. The credential information may be that which he user has previously provided for registration with access management system 140.

Figure 4:
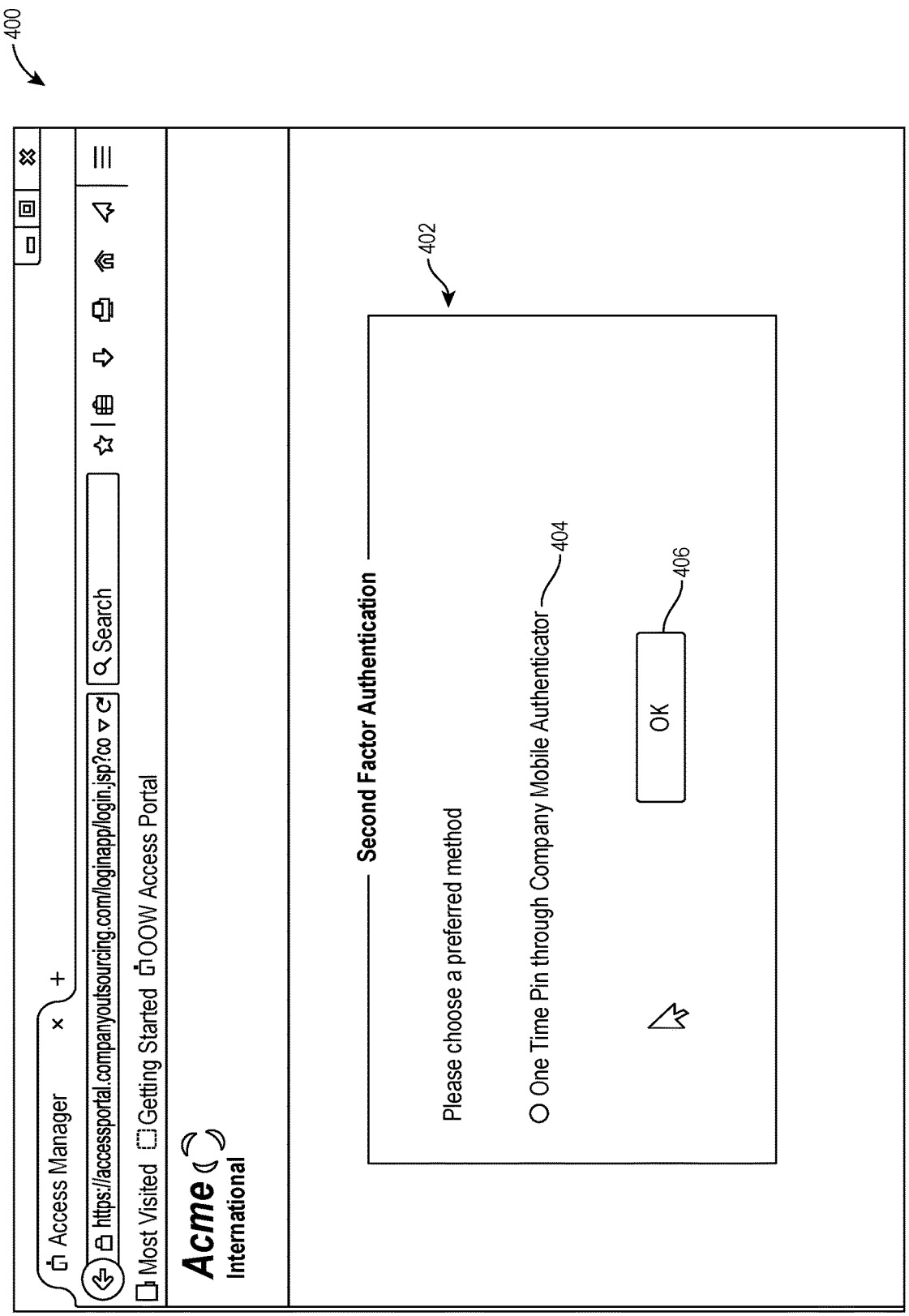
Figure 5:
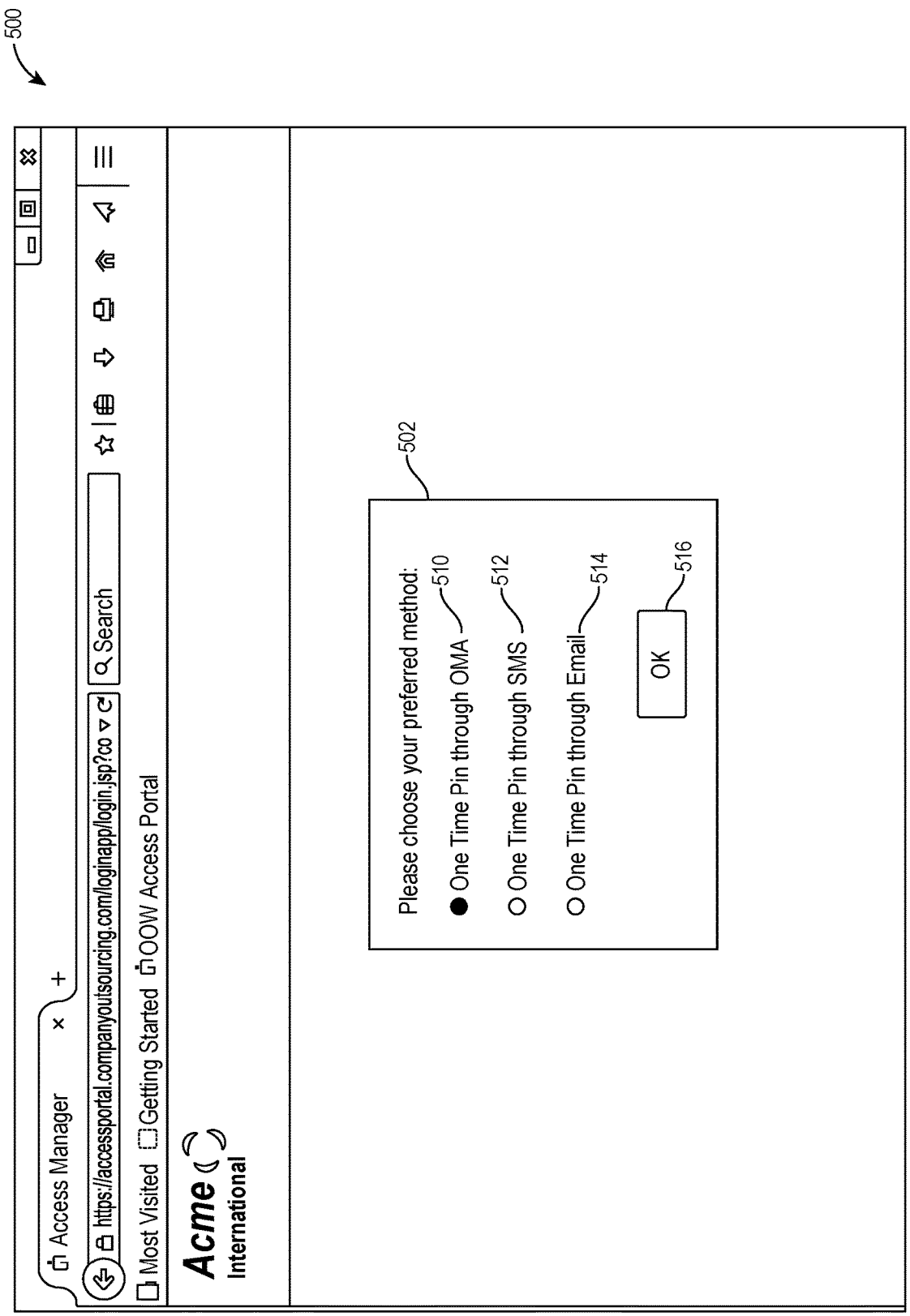

FIGS. 4 and 5 illustrate GUIs for an authentication process of multi-factor authentication of a user for registration of a device as a trusted device for password-less authentication. Each of GUI 400 of FIG. 4 or GUI 500 of FIG. 5 may present one or more interactive elements for selecting an option to receive security information. The security information may be associated with one or more criteria such that the security information is temporarily usable for authentication. GUI 400 may display an interactive area 402 with one or more interactive elements. Interactive element 402 may enable a user to select an option for a device (e.g., computing device 104 or client 204) to receive security information (e.g., a one-time password) at a mobile device, e.g., device 114 or client 202, in an application (e.g., mobile authenticator application) at the mobile device. Interaction with interactive element 406 may cause a device to request access management system 140 to request the mobile device to provide the security information. GUI 500 may display an interactive area 502 with one or more interactive elements, e.g., interactive elements 510, 512, 514, for selecting different options for obtaining security information. Interactive element 510 may corresponding to an option to receive security information at an application on a mobile device. Interactive element 512 may correspond to an option to receive security information at a mobile device using a short messaging service (SMS), such as a text message, to a location (e.g., phone number or email address)

associated with the user. Interactive element 514 may correspond to an option to receive security information at an email address associated with the user. Interaction with interactive element 516 may cause the device to request the security information corresponding to the selected option. By sending the security information to another device or location associated with a user, ensures that the security access information is not accessed by an unauthorized user.

Figure 6:
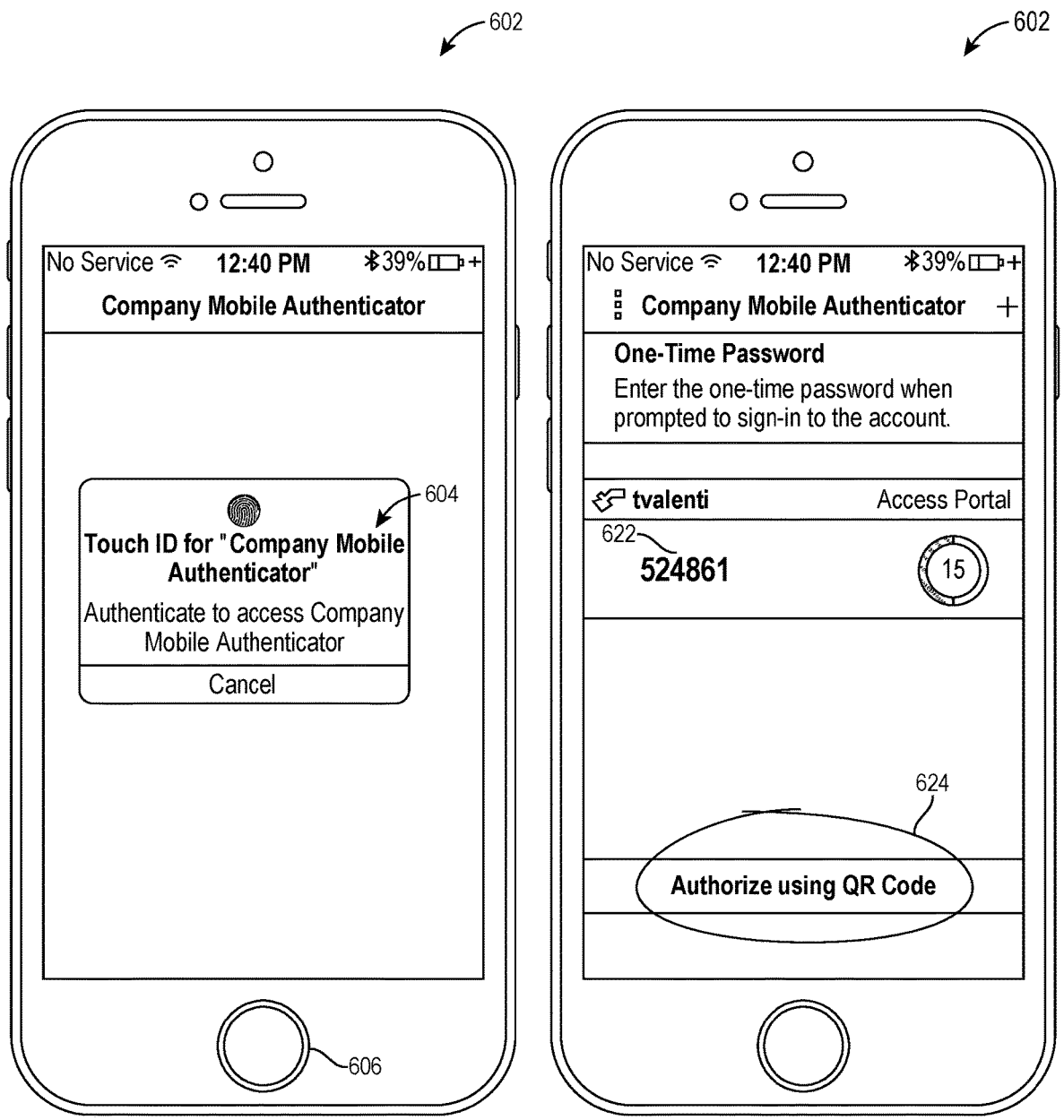

FIG. 6 illustrates an example of a device 602 (e.g., computing device 114 or client 202), that enables another device (e.g., computing device 104 or client 204) to be registered as a trusted device. Device 602 is shown with different GUIs of an application (e.g., mobile authenticator application) of access management system 140. The application may be used for registration of a device (e.g., client 204) as a trusted device and/or may be used for passwordless authentication of a user at the trusted device after registration. Device 602 may provide one or more authentication processes to access features of the application. The authentication processes may include multi-factor authentication, which can utilize authentication processes on device 602. For example, device 602 pay provide an interface with a prompt 604 requesting biometric (e.g., fingerprint) input for authentication. Interactive element 606 may be used to provide the biometric input.

Device 602 may provide an interface with an element 622 that provides security information for registration of a different device with access management system 140. As disclosed herein, the security information may be provided by access management system or may be generated at device 602 by the application. The security information may be displayed with one or more criteria (e.g., time) for use of the security information. Interactive element 624 may enable a user to request operation of device 602 to capture security data displayed at a device to be registered with access management system 140.

Figure 7:
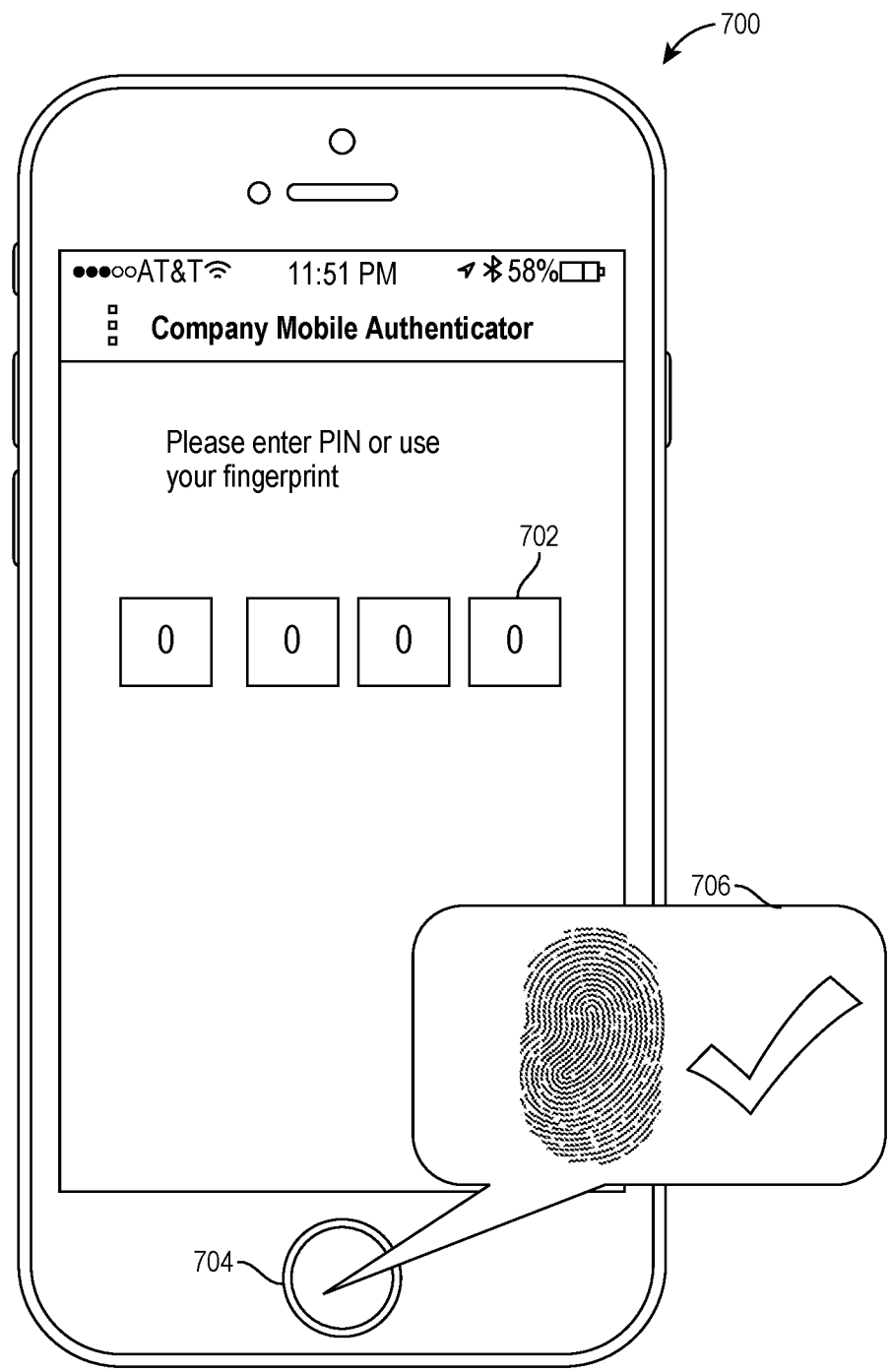
Figure 8:
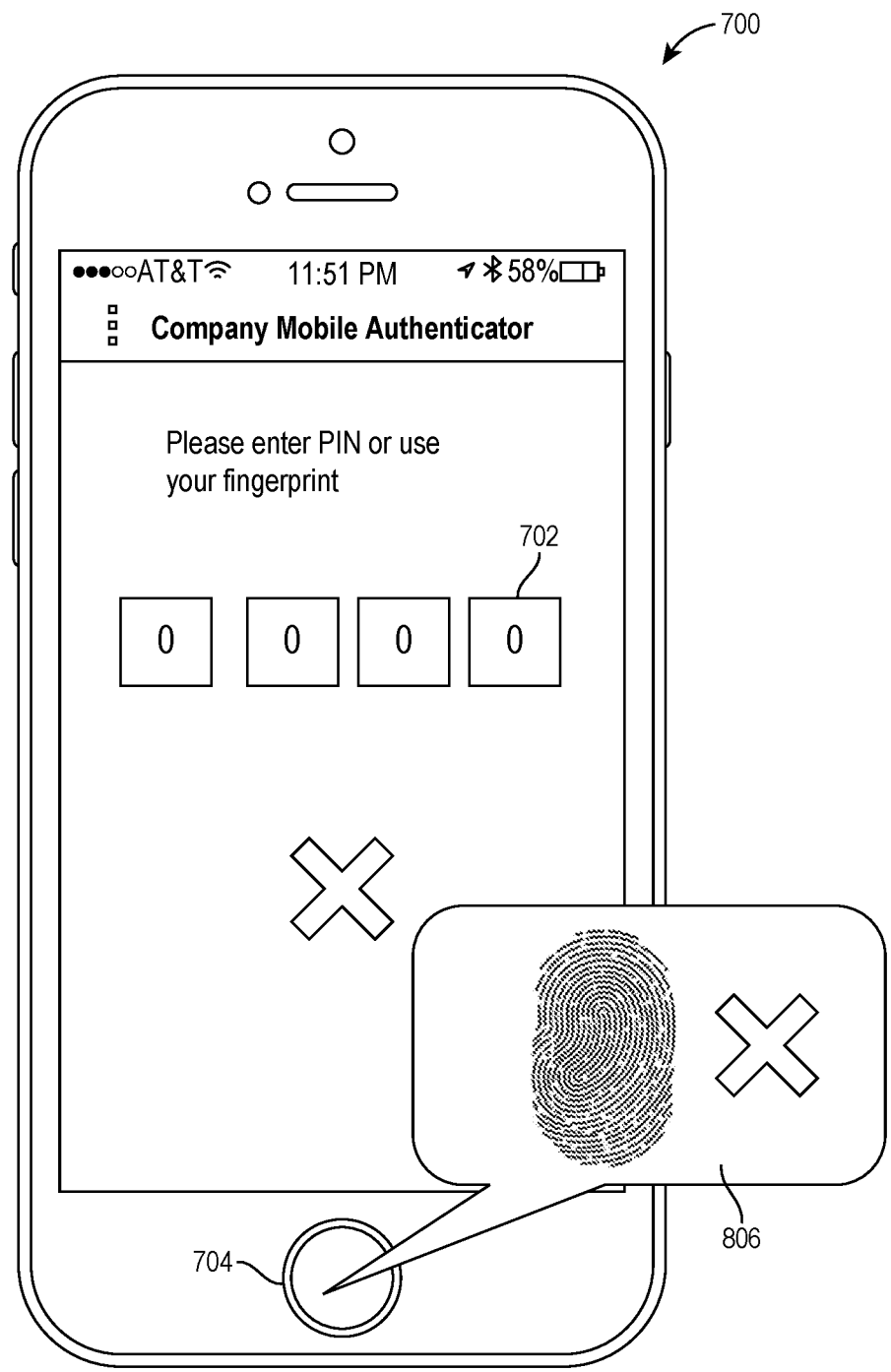

FIGS. 7 and 8 illustrates an example of a device 700 for providing an application (e.g., mobile authenticator application that provides a GUI for authentication of a user to access the application. Similar to FIG. 6, the application may support one or more authentication process, such as input of credential information (e.g., a code or personal identification number) and/or bio metric input. The authentication processes may be determined based on information provided to access management system 140 for registration of a user for authentication using the application. The credential information and biometric input may be registered for the application previously. The application may provide an interactive element 702 for receiving input of credential information. The application may provide an interactive element 704 for receiving biometric input. The application may determine authentication based on the input. The example in FIG. 7 shows successful authentication 706 based on input to either of the interactive elements 702, 704. The example in FIG. 8 shows unsuccessful authentication 806 based on user input to either of the interactive elements 702, 704. In some embodiments, the authentication process may prevent the application from being used for passwordless authentication upon determining that authentication was not successful. FIG. 8 shows a notification that a user cannot proceed with capturing security data using device 700.

Figure 9:
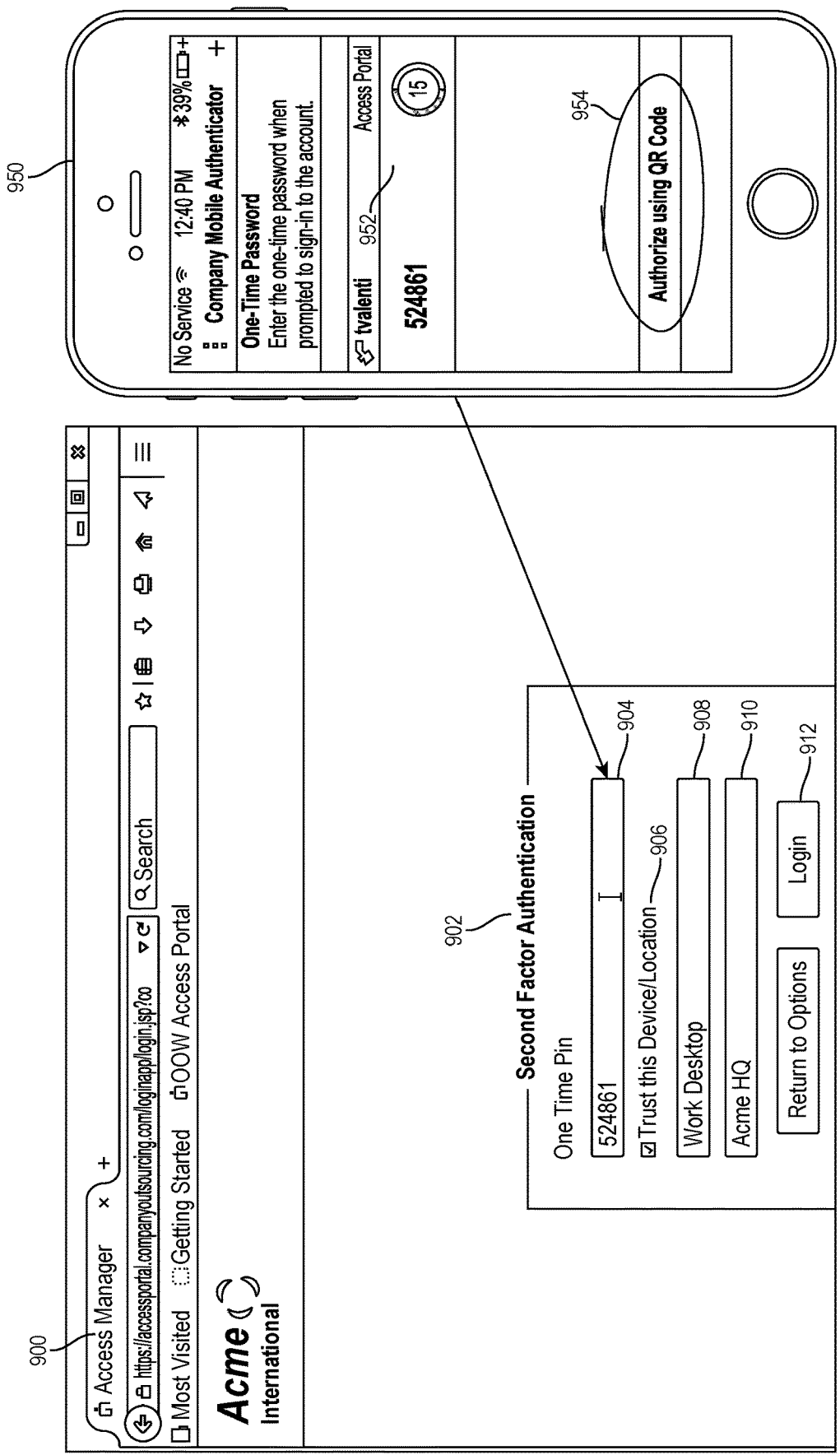

FIG. 9 shows GUIs on multiple devices, a device (e.g., client 204) presenting GUI 900 to be registered as a trusted device and device 950 to be used as a mobile authenticator for registration of the device. GUI 900 may include an interactive area 902 for a secondary authentication process of a multi-factor authentication process. For example, GUI 900 may be displayed for a secondary authentication process after an initial authentication process shown in FIG. 3. Interactive area 902 may include interactive elements for the secondary authentication process for registering the device (e.g., client 204). Interactive element 904 may be interactive to receive input of security information, such as a one-time password provided by one of the options selected in FIG. 4 or 5. As shown in FIG. 9, the security information may be received by one option, which is at an application (e.g., mobile authenticator application) at device 950. Device 950 shows a GUI similar to what is shown in FIG. 6. Device 950 may provide a GUI with an interactive element 952 indicating security information. The GUI may provide an interactive element 954 for requesting to capture security data from the GUI 900. Interactive element 906 in GUI 900 may be interactive to enable a user to specify whether the device/location is to be registered as a trusted device/location. Interactive elements 908 and 910 may receive input for configuring information (e.g., name and location) for the trusted device/location. Interactive element 912 may receive input to request authentication for the secondary authentication process. Interactive element 914 may receive input to change the GUI to present options for secondary authentication as disclosed in the GUIs in FIGS. 4 and 5.

FIG. 10 illustrates a GUI 1000 of an application providing access to one or more resources upon authentication of a user with access management system 140. The authentication may be performed as a multi-factor authentication process for registering a client device as a trusted device/location. GUI 1000 may provide interactive elements 1010, 1012, 1014, 1016, 1018 for each resource that is accessible upon successful authentication. GUI 1000 may include an interactive element 1002 to control one or more settings for access management. Interaction with interactive element 1002 may cause any of the GUIs in FIGS. 11 and 12 to be presented at the device.

Figure 11:
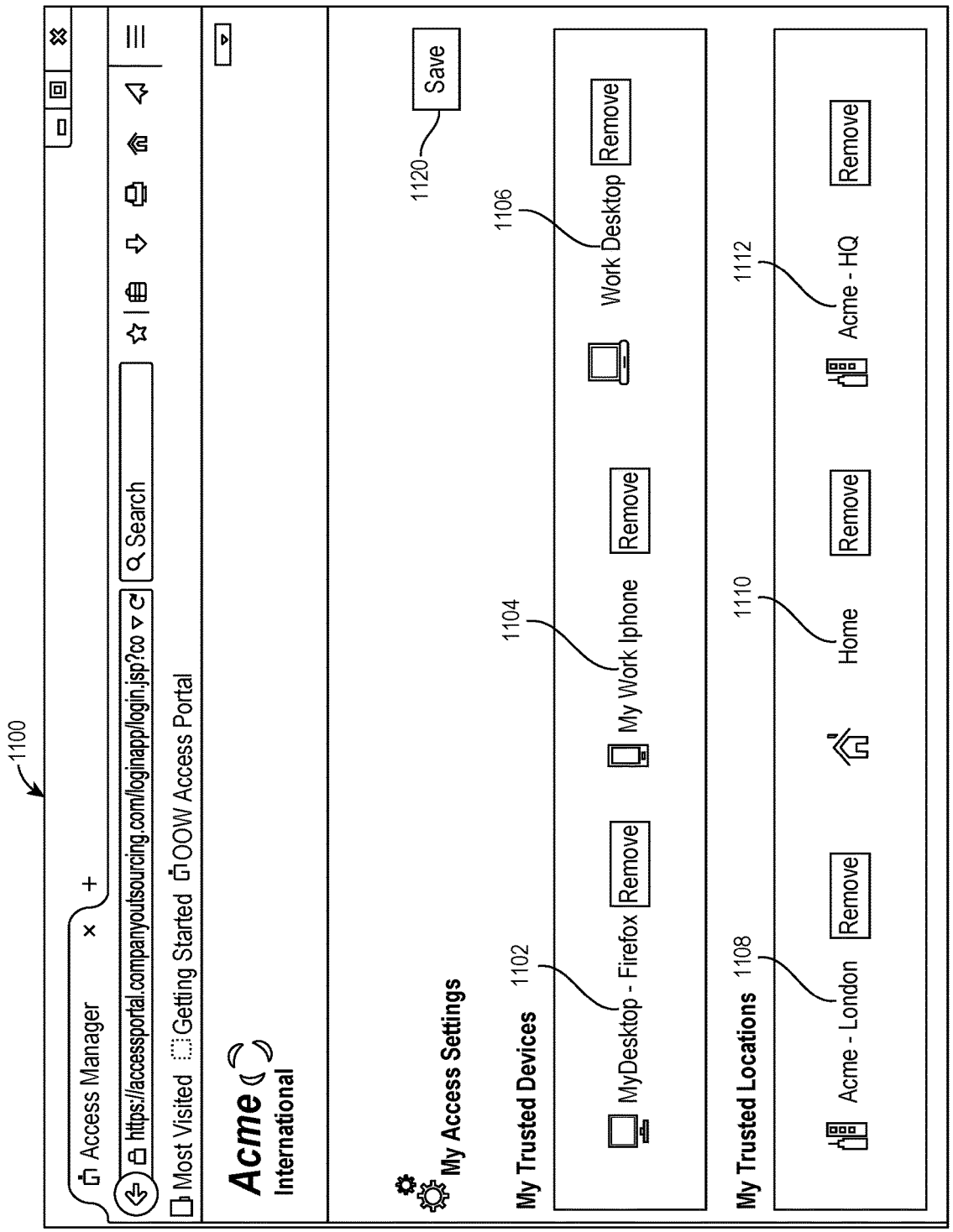

FIG. 11 illustrates GUI 1100 which displays information about trusted devices and trusted locations verified by access management system 140. GUI 1100 may include interactive elements to configure and/or the locations and the devices. GUI 1100 may include an interactive element for each device and each location registered as being trusted with access management system. For example, GUI 1100 may include interactive elements 1102, 1104, and 1106, for each respective different device, device 1 (e.g., "MyDesktop—Firefox"), device 2 (e.g., "My Work Iphone"), and device 3 (e.g., "Work Desktop"), registered with access management system 140. Each of the devices may be associated with one or more trusted locations. GUI 1100 may include interactive elements 1108, 1110, and 1112 for each respective location (e.g., "Acme—London"), location (e.g., "Home"), and location (e.g., "Acme—HQ"). Each of the interactive elements may be interactive to cause a GUI (e.g., a GUI in FIG. 12) to be displayed that is interactive to configure settings for devices and/or locations that are trusted. GUI 1100 may include an interactive element 1120 ("save") to configure settings saved using GUI 1100.

FIG. 12 illustrates a GUI 1200 which displays information about trusted devices and trusted locations verified by access management system 140. Similar to FIG. 11, GUI 1200 can include one or more interactive elements 1202 for configuring devices that are registered as trusted. GUI 1200 can include one or more interactive elements 1204 for configuring locations that are registered as trusted. In some embodiments, GUI 1200 may include one or more interactive elements 1206 to configure settings for managing access to trusted devices and locations. The settings may include one or more attributes such as challenge questions and answers. GUI 1200 may include one or more interactive elements 1208 to configure settings for one or more authentication processes, such as a second factor authentication. The settings for a secondary factor authentication may include preferences for receiving security information (e.g., a one-time password) and criteria associated with those preferences.

The information displayed in FIGS. 11 and 12 may be obtained from access management system upon authentication of a user at a device or location, such as any one of the registered devices or locations.

Figure 13:
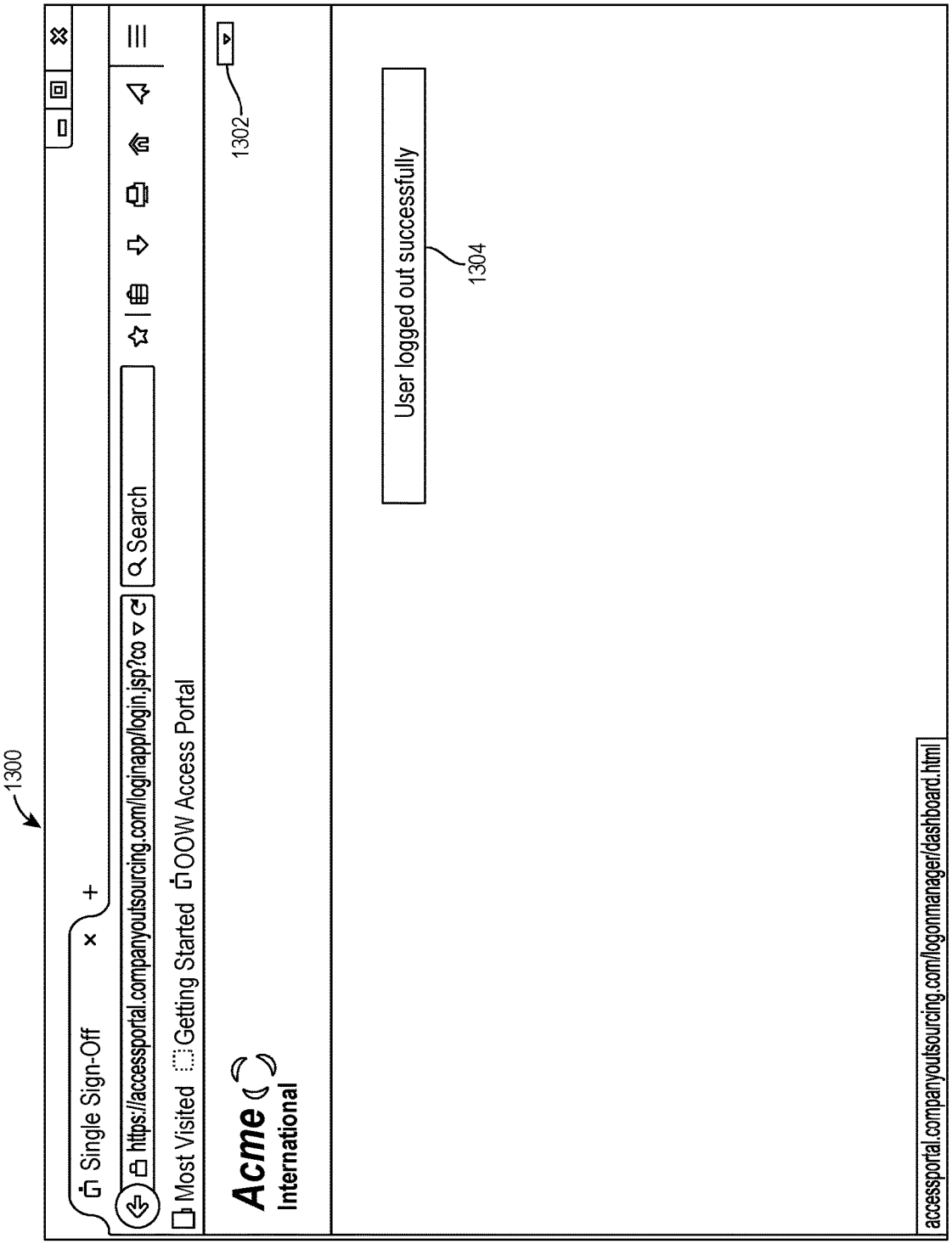

FIG. 13 illustrates a GUI 1300 that can be displayed at a device that is registered as trusted. GUI 1300 may be displayed upon a user requesting to terminate (e.g., logout or sign0off) an access session after authentication. GUI 1300 may be displayed after any of the GUIs in FIGS. 10-12. GUI 1300 may include an interactive element 1302 to request access management to terminate an access session after authentication. GUI 1300 may display an indication 1304 upon successful completion of termination of an access session.

Figure 14:
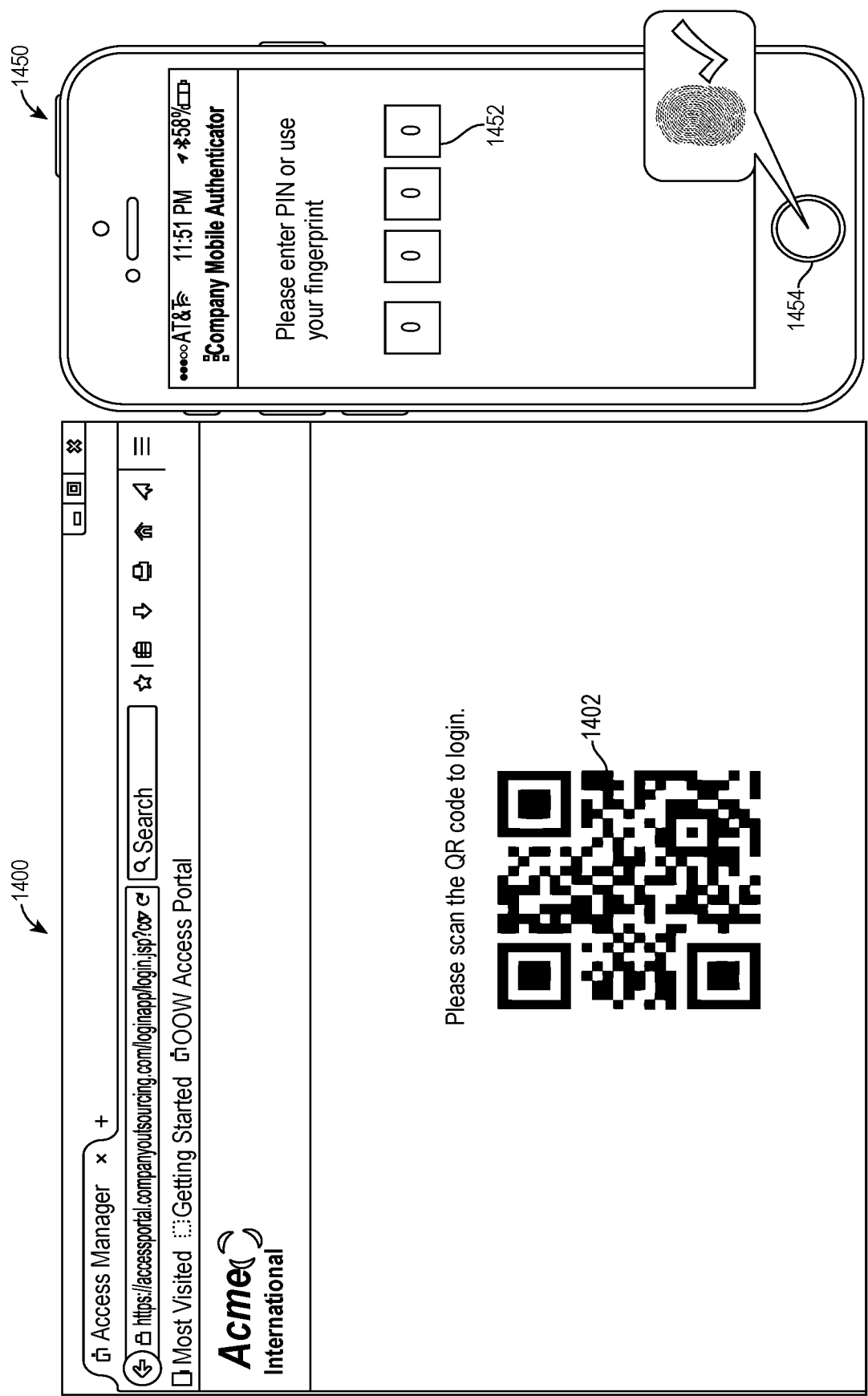

FIG. 14 illustrates a GUI 1400 at a device that is registered as a trusted device with access management system 140. After a user terminates an access session, such as shown in FIG. 13, a user may be presented with an option for password-less authentication from the same device that was registered during a previous authentication. Upon determination by access management system 140 that the device is registered as trusted device or that the device is located at a trusted location, GUI 1400 may be presented in an application at the device. GUI 1400 may provide security data for password-less authentication. As explained above, the security data may include security information. The security data may be presented 1402 (e.g., a QR code) at the device to enable another registered device, e.g., mobile device 1450 to be used for password-less authentication. Device 1450 may be used to capture the security data.

Device 1450 may be registered with access management system 140. An application (e.g., mobile authenticator application) on device 1450 may request a user to authenticate to use the application. The authentication may include techniques disclosed herein, such as with reference to FIG. 7. For example, device 1450 may provide an interface for authentication, including interactive element 1452 for receiving input (e.g., a personal identification code) and interactive element 1454 for receiving biometric input. The authentication may include communication with access management system 140. The authentication provides an added level of security for password-less authentication.

Upon successful authentication of a user, the application may be used to capture security data presented 1402 in GUI 1400. For example, the application may enable operation of a camera of device 1450 to capture the security data.

Figure 15:
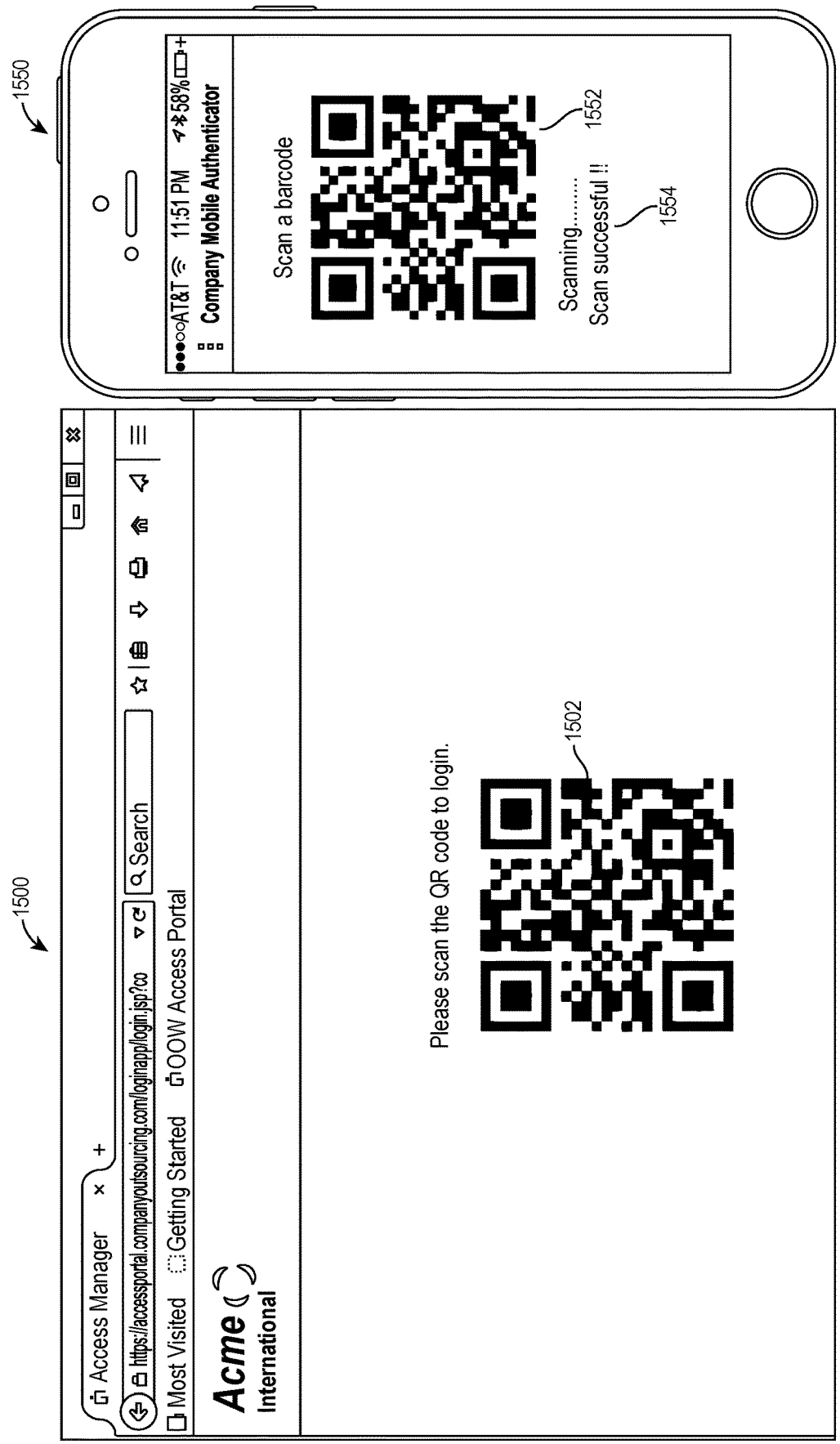
Figure 16:
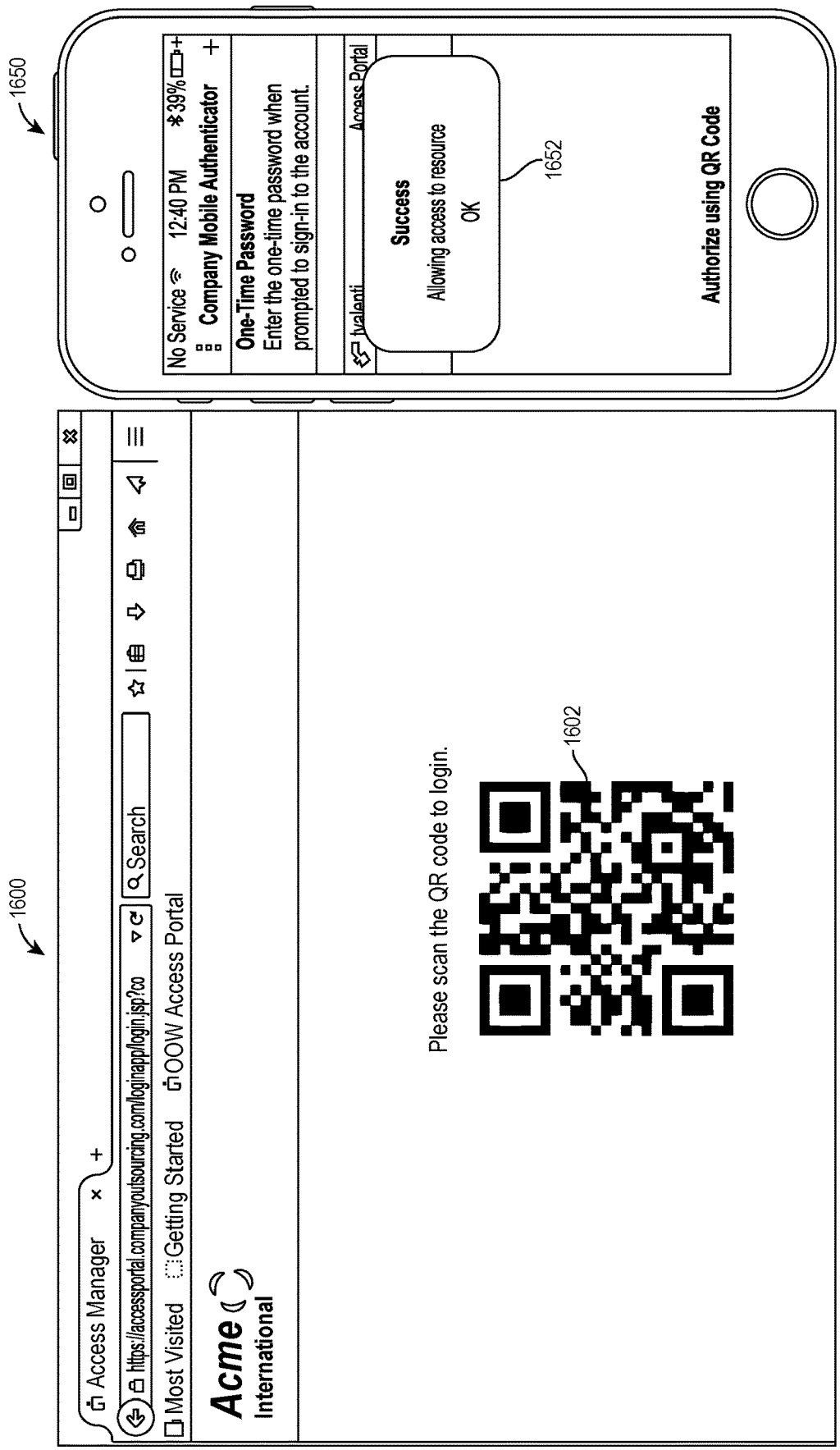
Figure 17:
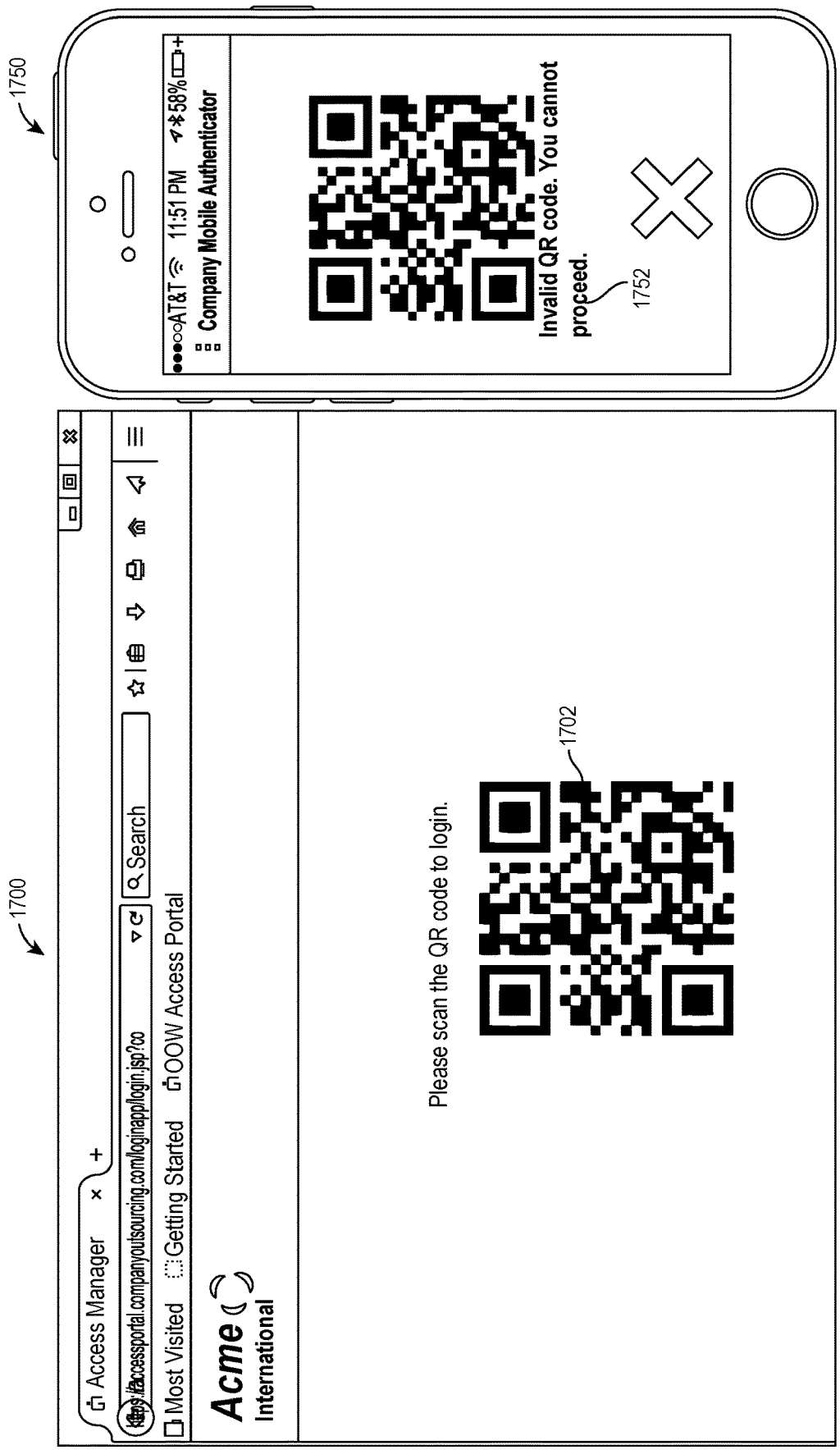

GUI 1500 of FIG. 15, GUI 1600 if FIG. 16, and GUI 1700 of FIG. 17 are similar to GUI 1400, presenting security data 1502, 1602, 1702 at a device that has been registered as a trusted device. Device 1550 of FIG. 15, device 1650 of FIG. 16 and device 1750 of FIG. 17 may be a device similar to device 1450 used as a mobile authenticator for password-less authentication. In FIG. 15, the application on a device 1550 (e.g., device 1450) may change its display to show the security data 1552 that is captured and status information about processing of the security data to determine whether the security data can be accessed by the user that authenticated at device 1450. As disclosed herein, a mobile device, such as device 1550, may be operated as an authenticator to process the security data to determine whether the application an decrypt information in the security data. Device 1550 may use security information (e.g., an encryption key) provided by access management system 140 to decrypt the security data. Device may send the decrypted security data to access management system 140 for verification as to whether it matches security information included in security data that was generated by access management system 140. Device 1550 may display a notification 1554 ("scan successful") when it determines (e.g., receives a notification from access management system 140) that the security data was decrypted successfully.

In another example of FIG. 16, device 1650 may display a notification 1652 that the security data was read and decrypted successfully. The notification may indicate that the trusted device which presented the security data may be enabled with access to a resource. In another example of FIG. 17, device 1750 may display a notification 1752 that the security data could not be decrypted ("invalid QR code") upon determining that the security data captured from GUI 1700 could not be decrypted.

Figure 18:
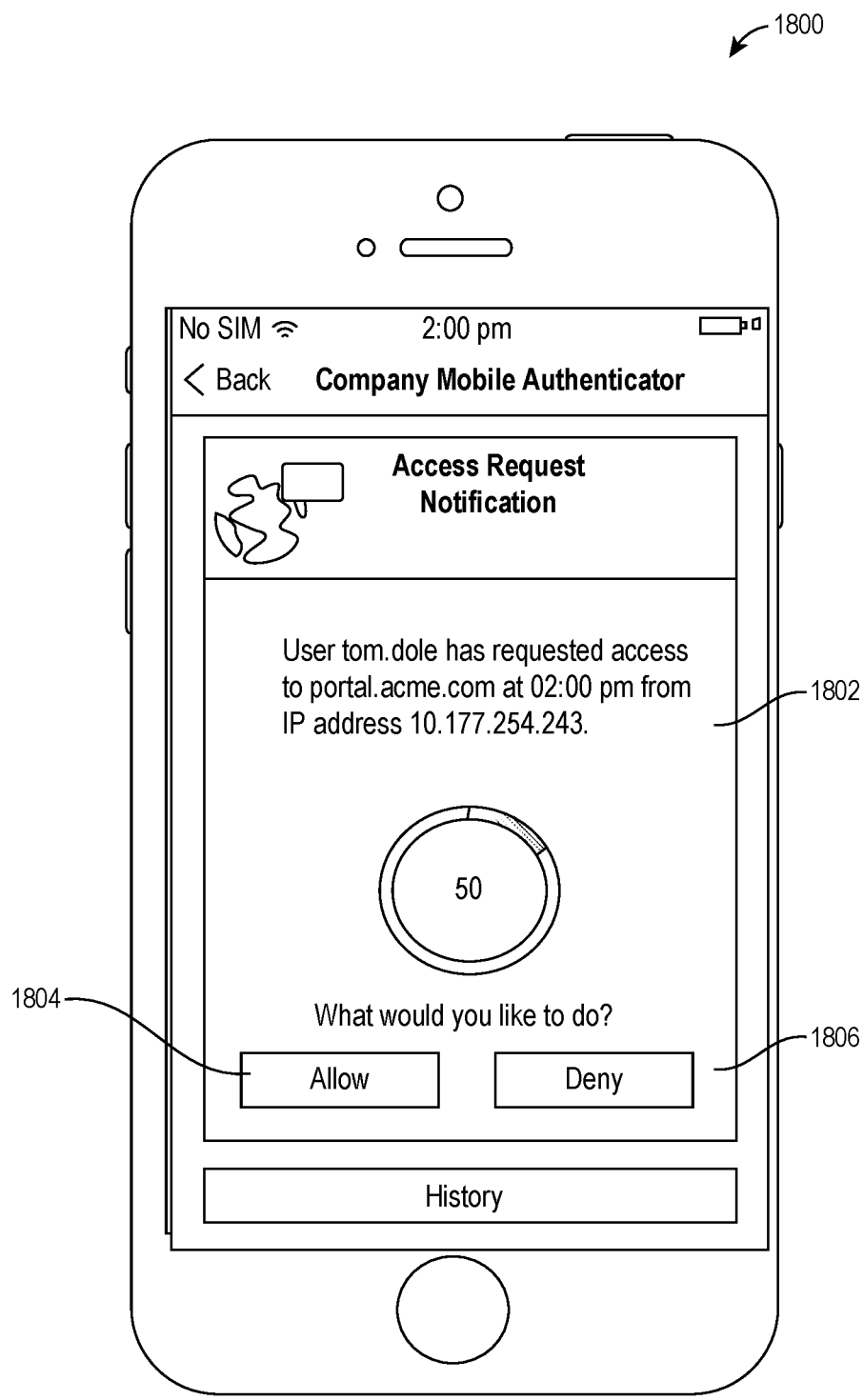

FIG. 18 illustrates an example of a device 1800 that is used as a mobile authenticator for password-less authentication. Interface 1802 may be presented as part of an application (e.g., mobile authenticator application). Interface 1802 may indicate a notification when access management system 140 receives a request from a trusted device to access resources based on password-less authentication. Interface 1802 may include an interactive element 1804 to allow the request and may include an interactive element 1806 to deny the request. Interaction with the interactive elements may enable the application to determine whether the user would like to engage in password-less authentication. The interfaces on the mobile devices disclosed herein for a mobile authentication application may be presented upon the user "allowing" the request for password-less authentication.

Figure 19:
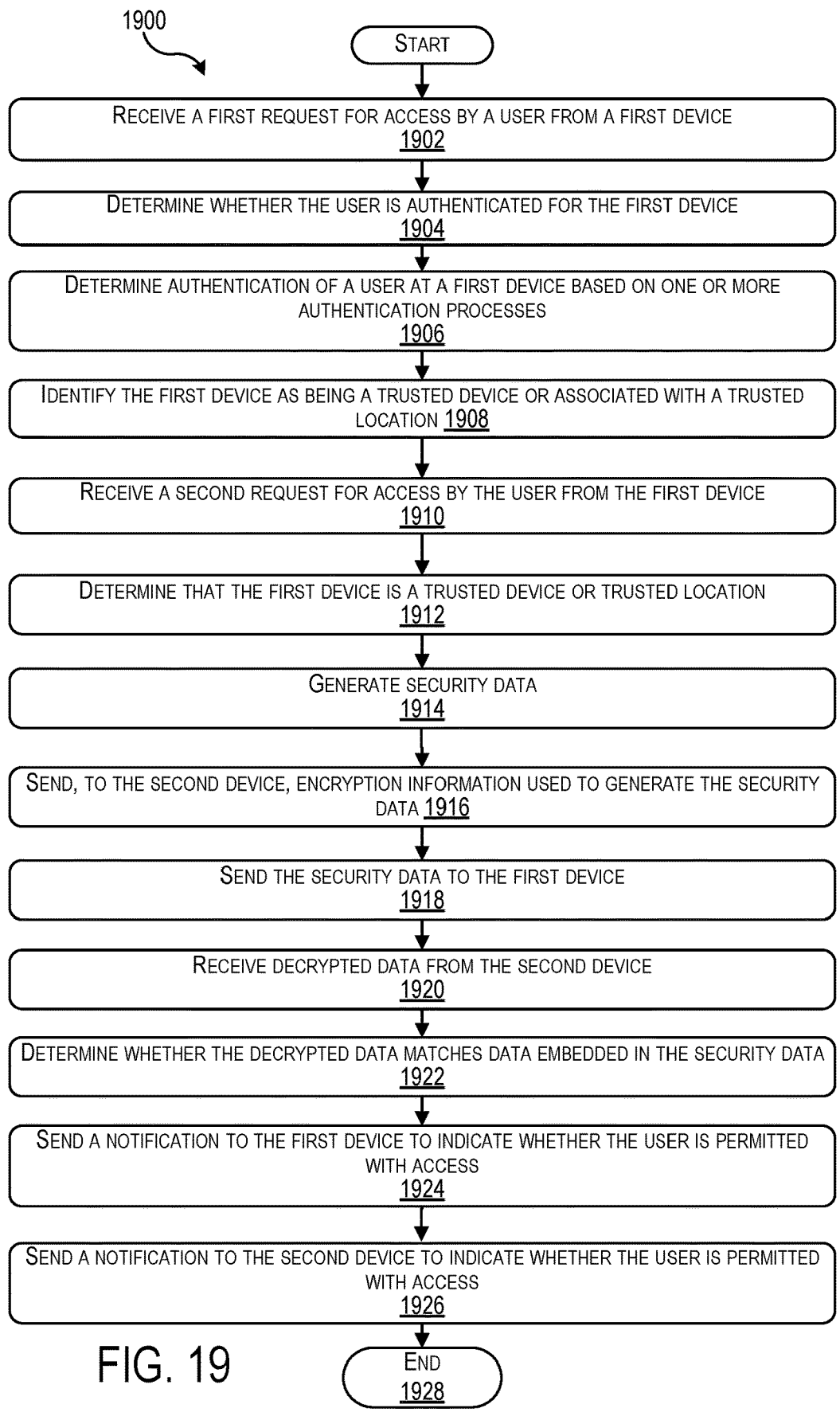
FIGS. 19 and 20 illustrate examples of flowcharts of processes for authentication according to some embodiments.

FIG. 19 illustrates a flowchart 1900 of a process for password-less authentication. The process may be implemented by access management system 140 of FIG. 1. The process may include registering a device/located as trusted before enabling password-less authentication.

Flowchart 1900 may at step 1902 begin by receiving a request (e.g., a first request) for access by a user from a device (e.g., a first device). The request may be to access a resource or may be an explicit request to register the first device for password-less authentication. Access may be based on authentication of the user at the device using one or more authentication process, such as multi-factor authentication. If a user is requesting access from the first device for the first time, then authentication of the user may be determined.

At step 1904, a determination is made whether the user is authenticated for the request. The request may include information about the first device and/or geo-location information about the first device. The information may be used to determine whether a user associated with the first device is authenticated. At step 1906, a determination of authentication of the user is made for the user at the first device. The authentication may be determined based on previous authentication, and if no previous authentication, one or more authentication processes may be performed for the user at the first device. Access management system 140 may send information to the first device for an application to prompt the user for input corresponding to each of the one or more authentication processes. Determining the authentication may include an authentication process whereby security information (e.g., one-time password) associated with criteria (e.g., time), is sent to one of multiple options for receiving the security information. Determining the authentication may include receiving credential information or other information (e.g., security information) for verification to determine the authentication. Determining the authentication may include communicating with a second device operated by the user as a mobile authenticator, which may provide the security information.

Access may be permitted based on determining that the user is authenticated according to the one or more authentication processes. The access may be terminated. The access may be terminated upon receiving a request from the first device to terminate (e.g., logout) of a session created to enable the user with access to one or more resources. The access may be terminated upon satisfaction of one or more criteria defining the access.

At step 1908, identify the first device as being a trusted device or associated with a trusted location. Upon determining that the user is authenticated at the first device, information about the first device and/or its location may be obtained from the first device in a communication with the first device for determining authentication. The information may be associated with the user for access managed by access management system. The first device and/or its location may be identified as a trusted source for access, thereby permitting password-less authentication upon subsequent requests from the device/location.

At step 1910, a request (e.g., a second request) for access by the user may be received from the first device. The second request may be received after the user previously authenticated with the access management system. For example, the second request may be received after an access session was terminated. The request may include information about the first device or its location.

At step 1912, a determination is made that the first device is a trusted device or location based on the information about the device and/or its location. The information may be identified as being associated with authentication of the previous user. As such, access management system can determine that the user is requesting access from a trusted device/location.

At step 1914, security data (e.g., a QR code) is generated for enabling password-less authentication since the request is from trusted device or location. The security data may be generated to include information. The information may be information specific to the user, such as identifying information about the user. The security data may be embedded with encrypted data, such as encrypted information. The data may be encrypted using one or more known techniques for encryption. The data may be encrypted using an encryption key. The security data may be associated with one or more criteria (e.g., a time period) for further ensuring secure use according to the criteria.

At step 1916, encryption information (e.g., an encryption key) may be sent to a second device that is registered by the user with the access management system. The second device is different from the first device. The second device may be a mobile device. The user may have authenticated with the access management system using an application (e.g., mobile authenticator application) on the second device. Information about the second device may be associated with the user. The second device can use the encryption key to decrypt the information embedded in the security data.

At step 1918, the security data may be sent to the first device. The first device may present (e.g., display) the security data at the first device. The security data may be presented in a manner sufficient for the user to perceive the security data based on the type of data.

At step 1920, data may be received from the second device. The second device may capture the security data presented by the first device. The second device may use the encryption key to decrypt security information in the security data captured from the first device. The decrypted security information may be the data received from the second device.

At step 1922, a determination is made whether the data received from the second device matches an unencrypted form of the data embedded in the security data generated at step 1914. The determination may include determining whether the data includes the information (e.g, related to the user) included in the data embedded in the security data. The user may be authenticated with access upon determining that the data received from the second device matches the data embedded in the security data generated. The data may match when the data includes the information originally included in the data encrypted in the security data. The user may not be authenticated with access upon determining that the data received from the second device does not match the data embedded in the security data generated. Access to the resource may be enabled by the access management system upon determining that the data includes the information (e.g, related to the user) included in the data embedded in the security data.

At step 1924, a notification is sent to the first device indicating whether the user is permitted with access based on authentication determined for the user at step 1922. The notification may be sent along with or separate from other information about resources that are accessible. The information may be used by the first device to access the resources if the user is authenticated to access those resources. An application (e.g., a portal on a website) at the first device may permit the user access resources through the application at the first device.

At step 1926, a notification is sent to the second device indicating whether the user is permitted with access based on authentication determined for the user at step 1922. An application on the second device may present the notification to enable the user to determine whether password-less authentication has permitted the user with access.

Flowchart 1900 may end at step 1928.

Figure 20:
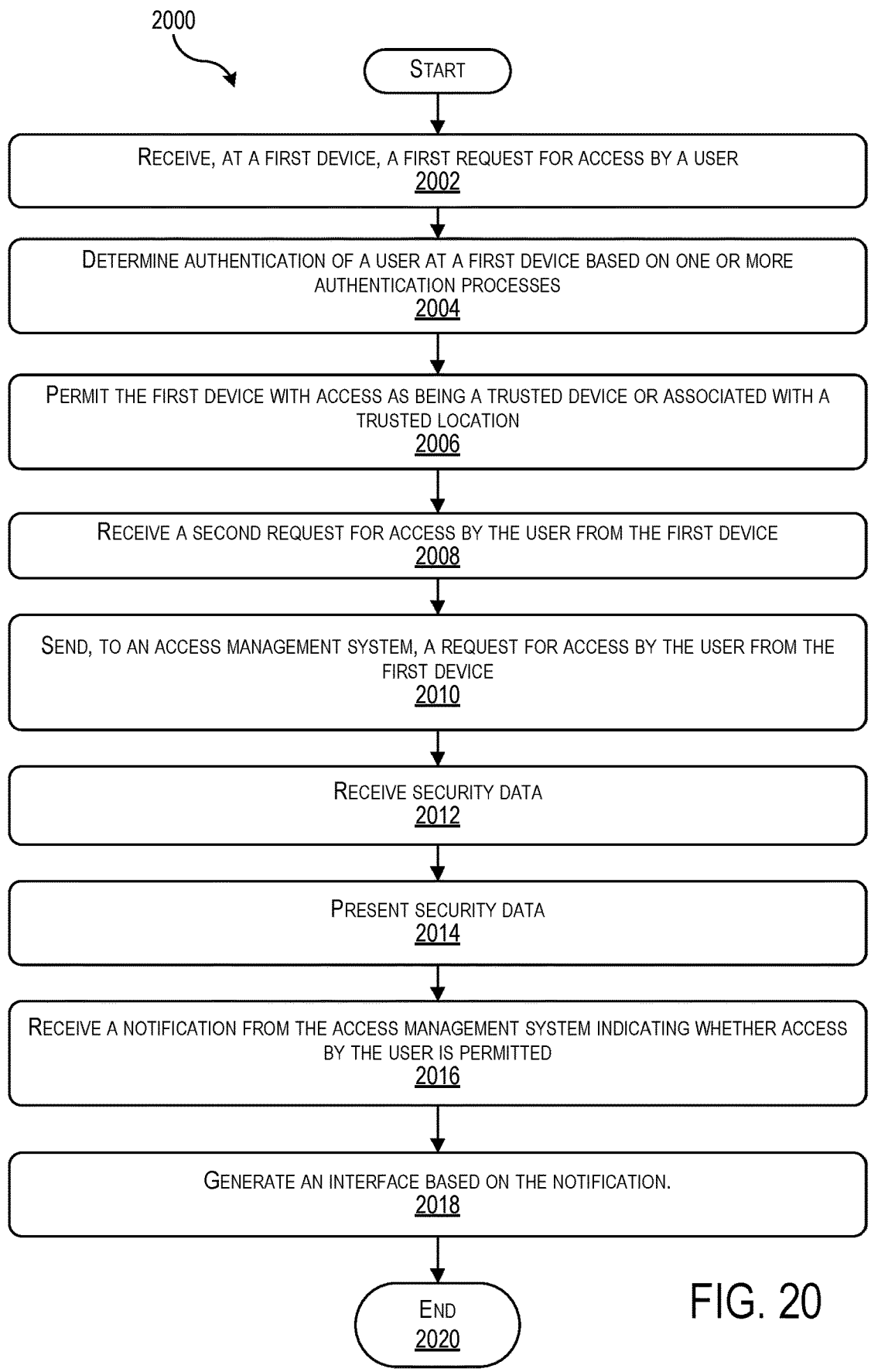

FIG. 20 illustrates a flowchart 2000 of a process for password-less authentication. The process may be implemented by a device (e.g. computing device 104 of FIG. 1) to be registered as a trusted device or associated with a trusted location. The process may include registering a device/located as trusted before enabling password-less authentication.

At step 2002, a request for access by a user is received at a first device. The request may be received through an interface of an application at the first device. The interface may be provided as part of a portal or application by access management system 140. The request may be for access to a resource or a request to register the first device as a trusted device.

At step 2004, determine authentication of the user based on one or more authentication processes defined for access by the access management system. The authentication processes may be those disclosed with reference to FIGS. 3-9. The authentication processes may include the user providing input, such as authentication credentials and security information provided by access management system. The authentication process(es) may be implemented with the aid of a second device, such as a mobile device with an application (e.g., mobile authenticator application), which provides information for aiding in the authentication process(es). The authentication process(es) may include receiving input at the first device via an interface and communicating with access management system 140 for verification of the input for the authentication processes. The authentication processes may be implemented to register the first device as a trusted device or at a trusted location.

At step 2006, the first device is permitted with access as being a trusted device or a trusted location. The first device may receive information from access management system indicating that the first device is trusted based on the authentication of the user at step 2004. As such, the first device may permit the user with access to resources based on the information received from access management system 140.

At step 2008, the first device receives a second request for access by the user at the first device. The second request may be received after the user previously authenticated with the access management system. For example, the second request may be received after an access session was terminated.

At step 2010, the first device may send a request to an access management system upon determining that the user is authenticated with access as a trusted device. In some embodiments, the first device may send the second request and access management system 140 may send information indicating whether the first device is a trusted device and access is permitted by password-less authentication. The request may include information about the first device or its location.

At step 2012, security data is received from the access management system. The access management may generate the security data upon determining that the first device is a trusted device or at a trusted location. The security data can be generated by the first device upon receiving information (e.g., security information). The security data may be embedded with encrypted data that is encrypted based on information accessible to access management system 140.

At step 2014, the security data is presented in a format in which the security data is generated or received. The security data may be capture by another device, such as a second device that is registered for the user with access management system 140. The second device may include an application (e.g., mobile authenticator application) that can capture the security data presented at the first device. The second device may capture the security data, or a portion thereof, and then send data to access management system. The data may be obtained from the security data that is captured. The data may be generated based on decryption of encrypted data in the security data. The access management system may process the data received from the second device to determine whether the data received from the second device matches the data embedded in the security data received by the first device from the access management system 140.

At step 2016, the first device may receive a notification from the access management system. The notification may indicate whether the user is permitted with access based on authentication determined for the user. The notification may be sent along with or separate from other information about resources that are accessible. The information may be used by the first device to access the resources if the user is authenticated to access those resources. An application (e.g., a portal on a website) at the first device may permit the user access resources through the application at the first device. The user may be permitted with access by password-less authentication based on the security data that is captured by the second device and the data communicated to the access management system for the access management system to determine whether the first device is permitted with access for the user.

At step 2018, the first device may generate an interface (e.g., a GUI) for display information about the notification. The information may indicate whether the user is permitted with access based on authentication determined for the user. The interface may be GUI 1000 shown in FIG. 10 for enabling access to resources when the user is permitted with access. The interface may indicate a message that access is not permitted when the notification indicates access is not permitted.

Flowchart 2000 may end at step 2020.

Figure 21:
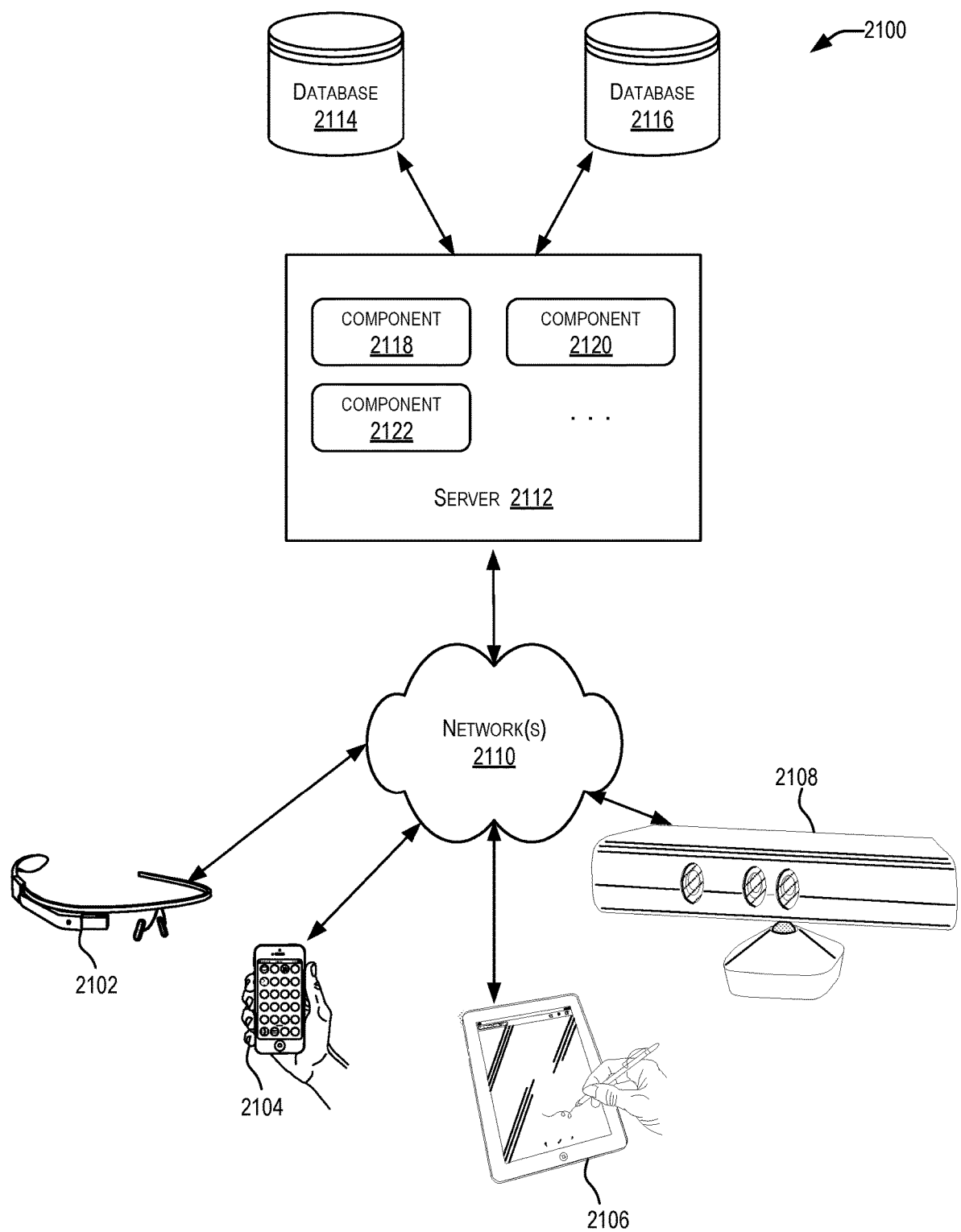
FIG. 21 depicts a simplified diagram of a distributed system for implementing an embodiment.

FIG. 21 depicts a simplified diagram of a distributed system 2100 for implementing an embodiment. In the illustrated embodiment, distributed system 2100 includes one or more client computing devices 2102, 2104, 2106, and 2108, which are configured to execute and operate a client application such as a web browser, proprietary client (e.g., Oracle Forms), or the like over one or more network(s) 2110. Server 2112 may be communicatively coupled with remote client computing devices 2102, 2104, 2106, and 2108 via network 2110.

In various embodiments, server 2112 may be adapted to run one or more services or software applications. In certain embodiments, server 2112 may also provide other services or software applications can include non-virtual and virtual environments. In some embodiments, these services may be offered as web-based or cloud services or under a Software as a Service (SaaS) model to the users of client computing devices 2102, 2104, 2106, and/or 2108. Users operating client computing devices 2102, 2104, 2106, and/or 2108 may in turn utilize one or more client applications to interact with server 2112 to utilize the services provided by these components.

In the configuration depicted in FIG. 21, software components 2118, 2120 and 2122 of system 2100 are shown as being implemented on server 2112. In other embodiments, one or more of the components of system 2100 and/or the services provided by these components may also be implemented by one or more of the client computing devices 2102, 2104, 2106, and/or 2108. Users operating the client computing devices may then utilize one or more client applications to use the services provided by these components. These components may be implemented in hardware, firmware, software, or combinations thereof. It should be appreciated that various different system configurations are possible, which may be different from distributed system 2100. The embodiment shown in FIG. 21 is thus one example of a distributed system for implementing an embodiment system and is not intended to be limiting.

Client computing devices 2102, 2104, 2106, and/or 2108 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2110.

Although distributed system 2100 in FIG. 21 is shown with four client computing devices, any number of client computing devices may be supported. Other devices, such as devices with sensors, etc., may interact with server 2112.

Network(s) 2110 in distributed system 2100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 2110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2112 can include one or more virtual machines running virtual operating systems, or other computing architectures involving virtualization. One or more flexible pools of logical storage devices can be virtualized to maintain virtual storage devices for the server. Virtual networks can be controlled by server 2112 using software defined networking. In various embodiments, server 2112 may be adapted to run one or more services or software applications described in the foregoing disclosure. For example, server 2112 may correspond to a server for performing processing as described above according to an embodiment of the present disclosure.

Server 2112 may run an operating system including any of those discussed above, as well as any commercially available server operating system. Server 2112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2112 may include one or more applications to analyze and consolidate data feeds and/or event updates received from users of client computing devices 2102, 2104, 2106, and 2108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2112 may also include one or more applications to display the data feeds and/or real-time events via one or more display devices of client computing devices 2102, 2104, 2106, and 2108.

Distributed system 2100 may also include one or more databases 2114 and 2116. These databases may provide a mechanism for storing information such as user interactions information, usage patterns information, adaptation rules information, and other information used by embodiments of the present disclosure. Databases 2114 and 2116 may reside in a variety of locations. By way of example, one or more of databases 2114 and 2116 may reside on a non-transitory storage medium local to (and/or resident in) server 2112. Alternatively, databases 2114 and 2116 may be remote from server 2112 and in communication with server 2112 via a network-based or dedicated connection. In one set of embodiments, databases 2114 and 2116 may reside in a storage-area network (SAN). Similarly, any necessary files for performing the functions attributed to server 2112 may be stored locally on server 2112 and/or remotely, as appropriate. In one set of embodiments, databases 2114 and 2116 may include relational databases, such as databases provided by Oracle that are adapted to store, update, and retrieve data in response to SQL-formatted commands.

Figure 22:
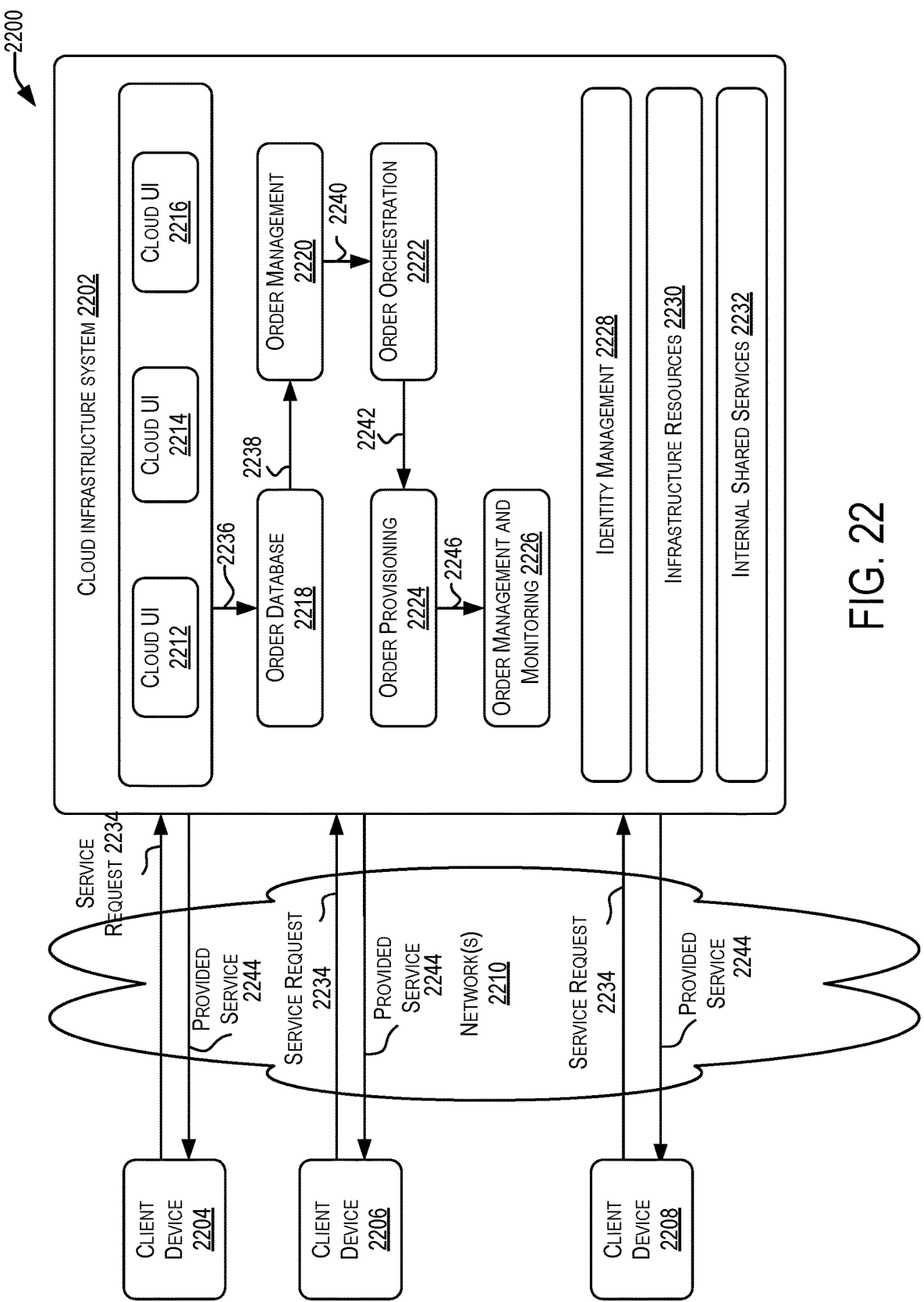
FIG. 22 illustrates a simplified block diagram of one or more components of a system environment in which services may be offered as cloud services, in accordance with an embodiment of the present disclosure.

In some embodiments, a cloud environment may provide one or more services. FIG. 22 is a simplified block diagram of one or more components of a system environment 2200 in which services may be offered as cloud services, in accordance with an embodiment of the present disclosure. In the illustrated embodiment in FIG. 22, system environment 2200 includes one or more client computing devices 2204, 2206, and 2208 that may be used by users to interact with a cloud infrastructure system 2202 that provides cloud services. Cloud infrastructure system 2202 may comprise one or more computers and/or servers that may include those described above for server 2112.

It should be appreciated that cloud infrastructure system 2202 depicted in FIG. 22 may have other components than those depicted. Further, the embodiment shown in FIG. 22 is only one example of a cloud infrastructure system that may incorporate an embodiment of the present disclosure. In some other embodiments, cloud infrastructure system 2202 may have more or fewer components than shown in the figure, may combine two or more components, or may have a different configuration or arrangement of components.

Client computing devices 2204, 2206, and 2208 may be devices similar to those described above for client computing devices 2102, 2104, 2106, and 2108. Client computing devices 2204, 2206, and 2208 may be configured to operate a client application such as a web browser, a proprietary client application (e.g., Oracle Forms), or some other application, which may be used by a user of the client computing device to interact with cloud infrastructure system 2202 to use services provided by cloud infrastructure system 2202. Although exemplary system environment 2200 is shown with three client computing devices, any number of client computing devices may be supported. Other devices such as devices with sensors, etc. may interact with cloud infrastructure system 2202.

Network(s) 2210 may facilitate communications and exchange of data between client computing devices 2204, 2206, and 2208 and cloud infrastructure system 2202. Each network may be any type of network familiar to those skilled in the art that can support data communications using any of a variety of commercially-available protocols, including those described above for network(s) 2110.

In certain embodiments, services provided by cloud infrastructure system 2202 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2202 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2202 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2202 may be adapted to automatically provision, manage and track a customer's subscription to services offered by cloud infrastructure system 2202. Cloud infrastructure system 2202 may provide the cloud services via different deployment models. For example, services may be provided under a public cloud model in which cloud infrastructure system 2202 is owned by an organization selling cloud services (e.g., owned by Oracle Corporation) and the services are made available to the general public or different industry enterprises. As another example, services may be provided under a private cloud model in which cloud infrastructure system 2202 is operated solely for a single organization and may provide services for one or more entities within the organization. The cloud services may also be provided under a community cloud model in which cloud infrastructure system 2202 and the services provided by cloud infrastructure system 2202 are shared by several organizations in a related community. The cloud services may also be provided under a hybrid cloud model, which is a combination of two or more different models.

In some embodiments, the services provided by cloud infrastructure system 2202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2202. Cloud infrastructure system 2202 then performs processing to provide the services in the customer's subscription order.

In some embodiments, the services provided by cloud infrastructure system 2202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2202 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2202 may also include infrastructure resources 2230 for providing the resources used to provide various services to customers of the cloud infrastructure system. In one embodiment, infrastructure resources 2230 may include pre-integrated and optimized combinations of hardware, such as servers, storage, and networking resources to execute the services provided by the PaaS platform and the SaaS platform, and other resources.

In some embodiments, resources in cloud infrastructure system 2202 may be shared by multiple users and dynamically re-allocated per demand. Additionally, resources may be allocated to users in different time zones. For example, cloud infrastructure system 2202 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2232 may be provided that are shared by different components or modules of cloud infrastructure system 2202 to enable provision of services by cloud infrastructure system 2202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2202, and the like.

In one embodiment, as depicted in FIG. 22, cloud management functionality may be provided by one or more modules, such as an order management module 2220, an order orchestration module 2222, an order provisioning module 2224, an order management and monitoring module 2226, and an identity management module 2228. These modules may include or be provided using one or more computers and/or servers, which may be general purpose computers, specialized server computers, server farms, server clusters, or any other appropriate arrangement and/or combination.

In an exemplary operation, at step 2234, a customer using a client device, such as client computing devices 2204, 2206 or 2208, may interact with cloud infrastructure system 2202 by requesting one or more services provided by cloud infrastructure system 2202 and placing an order for a subscription for one or more services offered by cloud infrastructure system 2202. In certain embodiments, the customer may access a cloud User Interface (UI) such as cloud UI 2212, cloud UI 2214 and/or cloud UI 2216 and place a subscription order via these UIs. The order information received by cloud infrastructure system 2202 in response to the customer placing an order may include information identifying the customer and one or more services offered by the cloud infrastructure system 2202 that the customer intends to subscribe to.

At step 2236, the order information received from the customer may be stored in an order database 2218. If this is a new order, a new record may be created for the order. In one embodiment, order database 2218 can be one of several databases operated by cloud infrastructure system 2202 and operated in conjunction with other system elements.

At step 2238, the order information may be forwarded to an order management module 2220 that may be configured to perform billing and accounting functions related to the order, such as verifying the order, and upon verification, booking the order.

At step 2240, information regarding the order may be communicated to an order orchestration module 2222 that is configured to orchestrate the provisioning of services and resources for the order placed by the customer. In some instances, order orchestration module 2222 may use the services of order provisioning module 2224 for the provisioning. In certain embodiments, order orchestration module 2222 enables the management of business processes associated with each order and applies business logic to determine whether an order should proceed to provisioning.

As shown in the embodiment depicted in FIG. 22, at step 2242, upon receiving an order for a new subscription, order orchestration module 2222 sends a request to order provisioning module 2224 to allocate resources and configure resources needed to fulfill the subscription order. Order provisioning module 2224 enables the allocation of resources for the services ordered by the customer. Order provisioning module 2224 provides a level of abstraction between the cloud services provided by cloud infrastructure system 2202 and the physical implementation layer that is used to provision the resources for providing the requested services. This enables order orchestration module 2222 to be isolated from implementation details, such as whether or not services and resources are actually provisioned on the fly or pre-provisioned and only allocated/assigned upon request.

At step 2244, once the services and resources are provisioned, a notification may be sent to the subscribing customers indicating that the requested service is now ready for use. In some instance, information (e.g. a link) may be sent to the customer that enables the customer to start using the requested services.

At step 2246, a customer's subscription order may be managed and tracked by an order management and monitoring module 2226. In some instances, order management and monitoring module 2226 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2200 may include an identity management module 2228 that is configured to provide identity services, such as access management and authorization services in cloud infrastructure system 2200. In some embodiments, identity management module 2228 may control information about customers who wish to utilize the services provided by cloud infrastructure system 2202. Such information can include information that authenticates the identities of such customers and information that describes which actions those customers are authorized to perform relative to various system resources (e.g., files, directories, applications, communication ports, memory segments, etc.) Identity management module 2228 may also include the management of descriptive information about each customer and about how and by whom that descriptive information can be accessed and modified.

Figure 23:
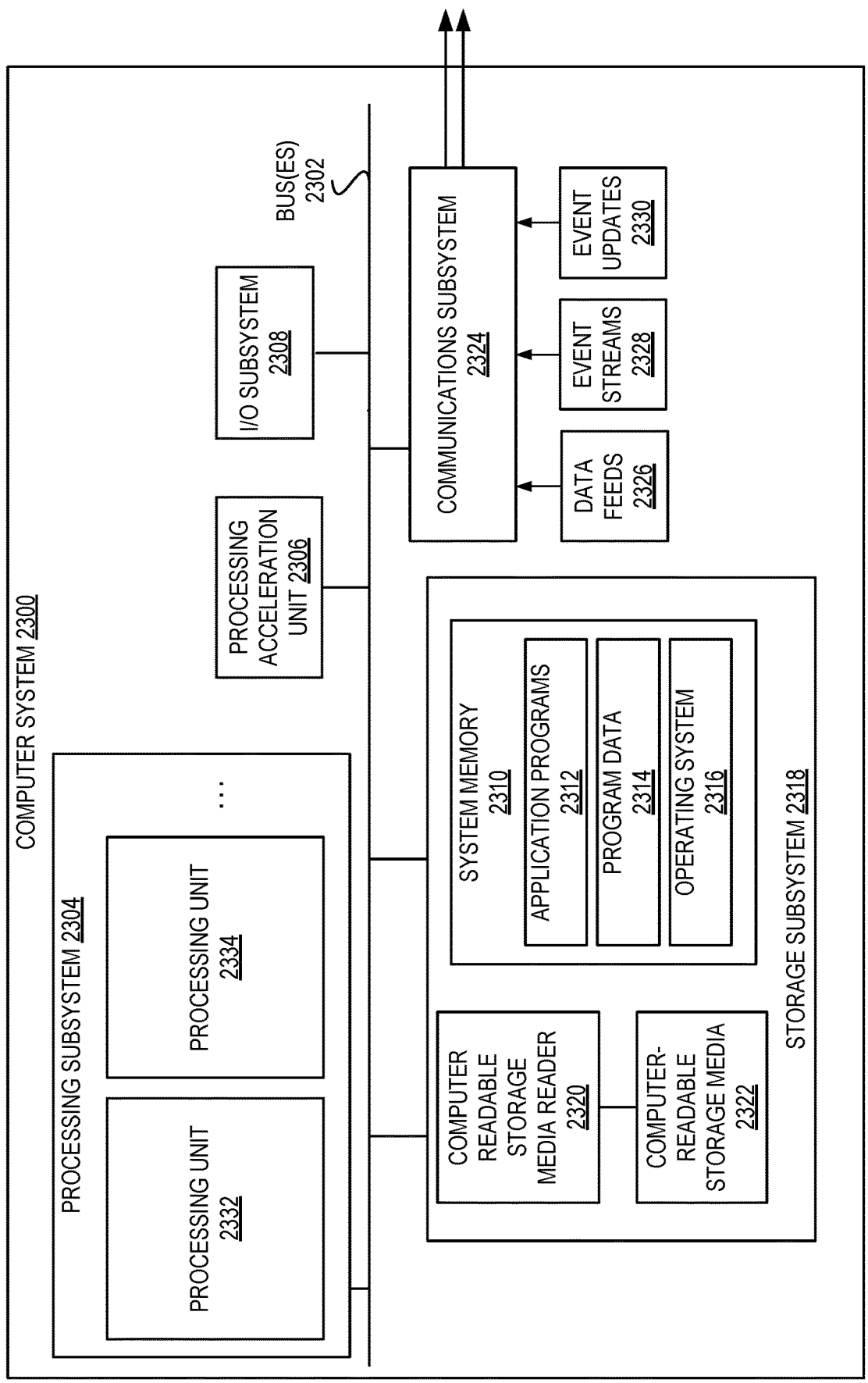
FIG. 23 illustrates an exemplary computer system that may be used to implement an embodiment of the present disclosure.

FIG. 23 illustrates an exemplary computer system 2300 that may be used to implement an embodiment of the present disclosure. In some embodiments, computer system 2300 may be used to implement any of the various servers and computer systems described above. As shown in FIG. 23, computer system 2300 includes various subsystems including a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. Storage subsystem 2318 may include tangible computer-readable storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative embodiments of the bus subsystem may utilize multiple buses. Bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2304 controls the operation of computer system 2300 and may comprise one or more processing units 2332, 2334, etc. A processing unit may include be one or more processors, including single core or multicore processors, one or more cores of processors, or combinations thereof. In some embodiments, processing subsystem 2304 can include one or more special purpose co-processors such as graphics processors, digital signal processors (DSPs), or the like. In some embodiments, some or all of the processing units of processing subsystem 2304 can be implemented using customized circuits, such as application specific integrated circuits (ASICs), or field programmable gate arrays (FPGAs).

In some embodiments, the processing units in processing subsystem 2304 can execute instructions stored in system memory 2310 or on computer readable storage media 2322. In various embodiments, the processing units can execute a variety of programs or code instructions and can maintain multiple concurrently executing programs or processes. At any given time, some or all of the program code to be executed can be resident in system memory 2310 and/or on computer-readable storage media 2322 including potentially on one or more storage devices. Through suitable programming, processing subsystem 2304 can provide various functionalities.

In certain embodiments, a processing acceleration unit 2306 may be provided for performing customized processing or for off-loading some of the processing performed by processing subsystem 2304 so as to accelerate the overall processing performed by computer system 2300.

I/O subsystem 2308 may include devices and mechanisms for inputting information to computer system 2300 and/or for outputting information from or via computer system 2300. In general, use of the term "input device" is intended to include all possible types of devices and mechanisms for inputting information to computer system 2300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2318 provides a repository or data store for storing information that is used by computer system 2300. Storage subsystem 2318 provides a tangible non-transitory computer-readable storage medium for storing the basic programming and data constructs that provide the functionality of some embodiments. Software (programs, code modules, instructions) that when executed by processing subsystem 2304 provide the functionality described above may be stored in storage subsystem 2318. The software may be executed by one or more processing units of processing subsystem 2304. Storage subsystem 2318 may also provide a repository for storing data used in accordance with the present disclosure.

Storage subsystem 2318 may include one or more non-transitory memory devices, including volatile and non-volatile memory devices. As shown in FIG. 23, storage subsystem 2318 includes a system memory 2310 and a computer-readable storage media 2322. System memory 2310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2300, such as during start-up, may typically be stored in the ROM. The RAM typically contains data and/or program modules that are presently being operated and executed by processing subsystem 2304. In some implementations, system memory 2310 may include multiple different types of memory, such as static random access memory (SRAM) or dynamic random access memory (DRAM).

By way of example, and not limitation, as depicted in FIG. 23, system memory 2310 may store application programs 2312, which may include client applications, Web browsers, mid-tier applications, relational database management systems (RDBMS), etc., program data 2314, and an operating system 2316. By way of example, operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2322 may store programming and data constructs that provide the functionality of some embodiments. Software (programs, code modules, instructions) that when executed by processing subsystem 2304 a processor provide the functionality described above may be stored in storage subsystem 2318. By way of example, computer-readable storage media 2322 may include non-volatile memory such as a hard disk drive, a magnetic disk drive, an optical disk drive such as a CD ROM, DVD, a Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2322 may provide storage of computer-readable instructions, data structures, program modules, and other data for computer system 2300.

In certain embodiments, storage subsystem 2318 may also include a computer-readable storage media reader 2320 that can further be connected to computer-readable storage media 2322. Together and, optionally, in combination with system memory 2310, computer-readable storage media 2322 may comprehensively represent remote, local, fixed, and/or removable storage devices plus storage media for storing computer-readable information.

In certain embodiments, computer system 2300 may provide support for executing one or more virtual machines. Computer system 2300 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2300. Accordingly, multiple operating systems may potentially be run concurrently by computer system 2300. Each virtual machine generally runs independently of the other virtual machines.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to establish a communication channel to one or more client computing devices via the Internet for receiving and sending information from and to the client computing devices.

Communication subsystem 2324 may support both wired and/or wireless communication protocols. For example, in certain embodiments, communications subsystem 2324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2324 can provide wired network connectivity (e.g., Ethernet) in addition to or instead of a wireless interface.

Communication subsystem 2324 can receive and transmit data in various forms. For example, in some embodiments, communications subsystem 2324 may receive input communication in the form of structured and/or unstructured data feeds 2326, event streams 2328, event updates 2330, and the like. For example, communications subsystem 2324 may be configured to receive (or send) data feeds 2326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2324 may be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2324 may also be configured to output the structured and/or unstructured data feeds 2326, event streams 2328, event updates 2330, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2300 depicted in FIG. 23 is intended only as a specific example. Many other configurations having more or fewer components than the system depicted in FIG. 23 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by an access management system (AMS), an access request from a first computer device of a user;
   responsive to the access request, determining by the AMS that the first computer device has been registered as a trusted device for the user;
   based on the determining that the first computer device has been registered as a trusted device for the user, sending first security data from the AMS to the first computer device, wherein the first security data is sent encrypted;
   receiving, by the AMS from a second computer device that is separate from the first computer device and that receives the first security data from the first computer device, second security data generated by the second computer device upon successful authentication of the user based on user input provided to the second computer device and by decrypting the first security data using an encryption key sent from the AMS to the second computer device;
   determining, by the AMS, that the second security data matches the first security data, and
   based on the determining that the second security data matches the first security data, enabling the first computer device to access a resource identified in the access request.

2. The method of claim 1, wherein the first security data is sent to the first computer device as a Quick Response code, and wherein the second computer device captures the first security data by scanning the Quick Response code on a display of the first computer device.

3. The method of claim 1, further comprising:
   registering the first computer device as a trusted device with the AMS prior to generation of the access request by the first computer device, the registering comprising:
      generating, by the AMS, temporary access information, the temporary access information comprising a one-time code valid for a particular time period;
      sending the temporary access information to the second computer device based on determining, by the AMS, that the second computer device has been registered as a trusted device for the user;
      receiving, by the AMS, the temporary access information from the first computer device;
      determining, by the AMS, that the received temporary access information matches the temporary access information sent to the second computer device; and
      responsive to the determining that the received temporary access information matches the temporary access information sent to the second computer device, storing, by the AMS, information for identifying the first computer device as a trusted device.

4. The method of claim 3, wherein the storing of the information for identifying the first computer device as a trusted device is conditioned upon the temporary access information being received from the first computer device within the particular time period for which the one-time code is valid.

5. The method of claim 3, wherein the information for identifying the first computer device as a trusted device comprises a geographic location of the first computer device.

6. The method of claim 5, wherein the determining that the first computer device has been registered as a trusted device for the user comprises determining that a geographic location of the first computer device when the access request was received by the AMS corresponds to the geographic location in the stored information.

7. The method of claim 1, wherein the authentication of the user is based on user input of a personal identification number.

8. The method of claim 1, wherein the authentication of the user is based on user input of biometric data.

9. The method of claim 1, further comprising:
sending the encryption key from the AMS to the second computer device based on determining, by the AMS, that the second computer device has been registered as a trusted device for the user.

10. A computer system comprising:
one or more processors; and
a memory accessible to the one or more processors, the memory storing instructions that, upon execution by the one or more processors, cause the one or more processors to:
receive an access request from a first computer device of a user;
responsive to the access request, determine that the first computer device has been registered as a trusted device for the user;
based on the determining that the first computer device has been registered as a trusted device for the user, send first security data to the first computer device, wherein the first security data is sent encrypted;
receive, from a second computer device that is separate from the first computer device and that receives the first security data from the first computer device, second security data generated by the second computer device upon successful authentication of the user based on user input provided to the second computer device and by decrypting the first security data using an encryption key sent from the computer system to the second computer device;
determine that the second security data matches the first security data, and
based on the determining that the second security data matches the first security data, enable the first computer device to access a resource identified in the access request.

11. The computer system of claim 10, wherein the first security data is sent to the first computer device as a Quick Response code, and wherein the second computer device captures the first security data by scanning the Quick Response code on a display of the first computer device.

12. The computer system of claim 10, wherein the instructions further cause the one or more processors to:
register the first computer device as a trusted device prior to generation of the access request by the first computer device, the registering comprising:
generating temporary access information, the temporary access information comprising a one-time code valid for a particular time period;
sending the temporary access information to the second computer device based on determining that the second computer device has been registered as a trusted device for the user;
receiving the temporary access information from the first computer device;
determining that the received temporary access information matches the temporary access information sent to the second computer device; and
responsive to the determining that the received temporary access information matches the temporary access information sent to the second computer device, storing information for identifying the first computer device as a trusted device.

13. The computer system of claim 12, wherein the information for identifying the first computer device as a trusted device comprises a geographic location of the first computer device.

14. The computer system of claim 13, wherein the determining that the first computer device has been registered as a trusted device for the user comprises determining that a geographic location of the first computer device when the access request was received by the computer system corresponds to the geographic location in the stored information.

15. The computer system of claim 10, wherein the instructions further cause the one or more processors to:
send the encryption key to the second computer device based on determining that the second computer device has been registered as a trusted device for the user.

16. A non-transitory computer-readable medium storing instructions that, when executed by one or more processors of a computer system, cause the one or more processors to perform processing comprising:
receiving an access request from a first computer device of a user;
responsive to the access request, determining that the first computer device has been registered as a trusted device for the user;
based on the determining that the first computer device has been registered as a trusted device for the user, sending first security data to the first computer device, wherein the first security data is sent encrypted;
receiving, from a second computer device that is separate from the first computer device and that receives the first security data from the first computer device, second security data generated by the second computer device upon successful authentication of the user based on user input provided to the second computer device and by decrypting the first security data using an encryption key sent from the computer system to the second computer device;
determining that the second security data matches the first security data, and
based on the determining that the second security data matches the first security data, enabling the first computer device to access a resource identified in the access request.

17. The non-transitory computer-readable medium of claim 16, wherein the first security data is sent to the first computer device as a Quick Response code, and wherein the second computer device captures the first security data by scanning the Quick Response code on a display of the first computer device.

18. The non-transitory computer-readable medium of claim 16, wherein the instructions further cause the one or more processors to perform processing comprising:
registering the first computer device as a trusted device prior to generation of the access request by the first computer device, the registering comprising:

generating temporary access information, the temporary access information comprising a one-time code valid for a particular time period;
sending the temporary access information to the second computer device based on determining that the second computer device has been registered as a trusted device for the user;
receiving the temporary access information from the first computer device;
determining that the received temporary access information matches the temporary access information sent to the second computer device; and
responsive to the determining that the received temporary access information matches the temporary access information sent to the second computer device, storing information for identifying the first computer device as a trusted device.

19. The non-transitory computer-readable medium of claim 18, wherein the information for identifying the first computer device as a trusted device comprises a geographic location of the first computer device.

20. The non-transitory computer-readable medium of claim 19, wherein the determining that the first computer device has been registered as a trusted device for the user comprises determining that a geographic location of the first computer device when the access request was received by the computer system corresponds to the geographic location in the stored information.

* * * * *